US008926801B2

(12) United States Patent
Rehman

(10) Patent No.: US 8,926,801 B2
(45) Date of Patent: Jan. 6, 2015

(54) METHODS OF ELECTROSPRAY CHEMICAL SYNTHESIS AND DEVICE FOR USE THEREIN

(75) Inventor: Atiq Rehman, Winnipeg (CA)

(73) Assignee: CanAm Bioresearch Inc., Winnipeg, MB (CA)

( * ) Notice: Subject to any disclaimer, the term of this patent is extended or adjusted under 35 U.S.C. 154(b) by 417 days.

(21) Appl. No.: 13/144,832

(22) PCT Filed: Jan. 15, 2010

(86) PCT No.: PCT/CA2010/000063
§ 371 (c)(1),
(2), (4) Date: Oct. 4, 2011

(87) PCT Pub. No.: WO2010/081236
PCT Pub. Date: Jul. 22, 2010

(65) Prior Publication Data
US 2012/0012453 A1    Jan. 19, 2012

Related U.S. Application Data

(60) Provisional application No. 61/145,186, filed on Jan. 16, 2009.

(51) Int. Cl.
*B01J 19/08* (2006.01)

(52) U.S. Cl.
USPC .......................................................... 204/165

(58) Field of Classification Search
USPC .................................................. 204/164, 165
See application file for complete search history.

(56) References Cited

U.S. PATENT DOCUMENTS

| 6,121,608 A * | 9/2000 | Takada et al. ................. 250/288 |
| 7,960,711 B1 * | 6/2011 | Sheehan et al. ............ 250/493.1 |
| 2005/0139156 A1 | 6/2005 | Ahn et al. | |

FOREIGN PATENT DOCUMENTS

WO    2005114691 A2    12/2005

OTHER PUBLICATIONS

Marquez et al., "Electron-Transfer-Catalyzed Dimerization of trans-Anethole: Detection of the Distonic Tetramethylene Radical Cation Intermediate by Extractive Electrospray Ionization Mass Spectrometry", J. Am. Chem. Soc. 2008, 130, 17208-17209.*
Ohlin, "Reaction dynamics and solution chemistry of polyoxometalates by electrospray ionization mass spectrometry," Chem. Asian J., vol. 7, No. 2, pp. 262-270 (2012) (abstract only).
Banerjee et al, "Electrospray ionization mass spectrometry: a technique to access the information beyond the molecular weight of the analyte," Int. J. Anal. Chem., vol. 2012, Article ID No. 282574 (2012).
Bothner et al, "Electrospray ionization of a whole virus: analyzing mass, structure and viability," Chem. Bio. Chem., vol. 5, pp. 258-260 (2004).
Fenn, "Electrospray wings for molecular elephants," Nobel Lecture, Dec. 8, 2002.
Muller et al, "Accelerated carbon-carbon bond-forming reactions in preparative electrospray," Chem. Int. Ed., vol. 51, pp. 11832-11835 (2012).

(Continued)

*Primary Examiner* — Kirshor Mayekar
(74) *Attorney, Agent, or Firm* — Panitch Schwarze Belisario & Nadel LLP

(57) ABSTRACT

The present invention relates to methods of production of chemical bonds and subsequent molecules by electrospray ionization and the design of an electrospray chemical synthesizer, for use in chemical synthesis and expedited organic chemical reactions.

4 Claims, 36 Drawing Sheets

(56) References Cited

OTHER PUBLICATIONS

Int'l Search Report issued May 3, 2010 in Int'l Application No. PCT/CA2010/000063.
Koyanagi et al, "A novel chemical reactor suited for studies of biophysical chemistry: Construction and evaluation of a selected ion flow tube utilizing an electrospray ion source and a triple quadrupole detection system," International Journal of MAss Spectrometry, vol. 65, No. 2-3, pp. 295-301 (Sep. 1, 2007).
Loo et al, "A new approach for the study of gas-phase ion-ion reactions using electrospray ionization," Journal of American Society for Mass Spectrometry, vol. 3, No. 7, pp. 695-705 (Oct. 1992).
Back cover page of Angewandte Chemie, 2012-51/47.
Griep-Raming et al, "An Electrospray Ionization Source for the Investigation of Thermally Initiated Reactions," Anal. Chem., vol. 72, pp. 5665-5668 (2000).
Van Berkel et al, "Changes in bulk solution pH caused by the inherent controlled-current electrolytic process of an electrospray ion source," International Journal of Mass Spectrometry and Ion Processes, vol. 162, pp. 55-67 (1997).
Enke et al, "Electrochemical processes in electrospray ionization mass spectrometry," Journal of Mass Spectrometry, vol. 35, pp. 939-952 (2000).
Van Berkel et al, "Electrochemistry spray Ion Source," Analytical Chemistry, pp. 5510-5520 (Aug. 1, 2007).
Van Berkel et al, "Enhanced Study and Control of Analyte Oxidation in Electrospray Using a Thin-Channel, Planar Electrode Emitter," Anal. Chem., vol. 74, pp. 5047-5056 (2002).
Van Berkel, "Insights into Analyte Electrolysis in an Electrospray Emitter from Chronopotentiometry Experiments and Mass Transport Calculations," J. Am. Soc. Mass. Spectrom., vol. 11, pp. 951-960 (2000).

* cited by examiner

US 8,926,801 B2

METHODS OF ELECTROSPRAY CHEMICAL SYNTHESIS AND DEVICE FOR USE THEREIN

CROSS-REFERENCE TO RELATED APPLICATION

This application is a Section 371 of International Application No. PCT/CA2010/000063, filed Jan. 15, 2010, which was published in the English language on Jul. 22, 2010, under International Publication No. WO 2010/081236 A1, which claims the benefit of U.S. Provisional Patent Application No. 61/145,186, filed Jan. 16, 2009, the disclosure of which is incorporated herein by reference.

FIELD OF INVENTION

The present invention relates to methods of production of chemical bonds and subsequent molecules by electrospray ionization and the design of an electrospray chemical synthesizer, for use in chemical synthesis and expedited chemical reactions.

BACKGROUND OF THE INVENTION

A typical electrospray source is a two-electrode, controlled-current electrochemical flow cell. The three steps involved during electrospray ionization (ESI) are: 1) generation and charging of ES droplets 2) evaporation of droplets 3) production of gas-phase ions. Electrospray technology is commonly used in mass spectrometry, colloid thrusters, polymer coating, nanospray direct writing and the paint industry. An electrospray (ES) is a very mild way of ionizing molecules for detection in the mass spectrometer (MS). Oxidation and reduction reactions have been reported in an electrospray ion source in the works of Van Berkel (Van Berkel, *J Am Soc Mass Spectrom*, 2000, 11(11): 951-60; Van Berkel et al., *Anal Chem*, 2002, 74(19): 5047-56) Van Berkel et al., *Anal Chem*, 2007, 79(15): 5510-20). All documents cited in this application are incorporated by reference. Chemical reactions occurring in the electrospray capillary. In this case, molecules react with the surface of the capillary tube (usually coated with a metal, e.g. palladium or gold) to yield various products. Under a variety of reaction conditions the solution mixture in the electrospray can be subjected to redox chemistry. Van Berkel's works verify this statement due to reported electrolysis and pH changes in electrospray ionization (Van Berkel et al. *Int J Mass Spectrum. Ion Processes*, 1997, 162: 55-62). The electrospray source has been used for initiation of thermally induced reactions; however, these reactions occur at the hot surface of the electrospray source and not in the electrospray cone (Griep-Raming and Metzger, *Anal Chem*, 2000, 72(22): 5665-8). Methods of elimination of oxidation or reduction reactions on conductive surfaces in the sample solution flow channel during electrospray ionization have been investigated (Whitehouse and White, PCT/US2005/017573). All previous investigations have been focused on the analytical aspect of molecules and none have suggested utilization of electrospray for chemical synthesis.

The present invention provides methods utilizing electrospray for organic syntheses which are both efficient and have a lower environmental impact compared to conventional methods.

SUMMARY OF THE INVENTION

The present invention provides a novel method of using electrospray ionization for organic chemical synthesis, and in particular, the synthesis of esters, amides, amines and alcohols. The present invention further provides an electrospray chemical synthesis system for use in such methods.

In one aspect, provided is a method of preparing and recovering an oxidation reaction product, comprising passing a reactant through an electrospray to provide an ionized reaction mixture and recovering said reaction product from the ionized reaction mixture.

In a further aspect, provided is a method of preparing and recovering a reduction reaction product comprising passing a reactant through an electrospray to provide an ionized reaction mixture and recovering said reaction product from the ionized reaction mixture.

In a further aspect, provided is a method of preparing and recovering an aldol condensation reaction product comprising passing an enol compound and a carbonyl compound through an electrospray to provide an ionized reaction mixture and recovering said reaction product from the ionized reaction mixture.

In a further aspect, provided is a method of preparing and recovering an amide comprising passing a carboxylic acid and an amine through an electrospray to provide an ionized reaction mixture and recovering said amide from the ionized reaction mixture.

In a further aspect, provided is a method of preparing and recovering a secondary amine comprising passing a nitro compound through an electrospray to provide an ionized reaction mixture and recovering said secondary amine from the ionized reaction mixture.

In a further aspect, provided is a method of preparing and recovering an imine comprising passing an amine, and an aldehyde through an electrospray to provide an ionized reaction mixture and recovering imine from the ionized reaction mixture.

In a further aspect, provided is a method of preparing and recovering an alkyl amine, comprising passing a amine and an alkyl halide through an electrospray to provide an ionized reaction mixture and recovering said alkyl amine from the ionized reaction mixture.

In a further aspect, provided is a method of preparing and recovering reaction product resulting from the hydrolysis of an ester comprising passing an ester through an electrospray to provide an ionized reaction mixture and recovering said reaction product from the ionized reaction mixture.

In a further aspect, provided is a method of preparing and recovering a mono or di acetal comprising passing an aldehyde and alcohol through an electrospray to provide an ionized reaction mixture and recovering said mono or di acetal from the ionized reaction mixture.

In a further aspect, provided is a method of preparing and recovering an alcohol and carboxylic acid comprising passing an ester through an electrospray to provide an ionized reaction mixture and recovering said alcohol and carboxylic acid from the ionized reaction mixture.

In a further aspect, provided is a method of preparing and recovering an alcohol oxidation product comprising passing an alcohol through an electrospray to provide an ionized reaction mixture and recovering said alcohol oxidation product from the ionized reaction mixture.

In a further aspect, provided is a method of preparing and recovering a reaction product resulting from the reduction of nitro compound, comprising passing a nitro compound through an electrospray to provide an ionized reaction mixture and recovering the reduced product from the ionized reaction mixture.

In a further aspect, provided is a method of preparing and recovering a Suzuki reaction product, comprising passing aryl- or vinyl-boronic acid with an aryl- or vinyl-halide and traces of Pd catalyst through an electrospray to provide an ionized reaction mixture and recovering said reaction product from the ionized reaction mixture.

In a further aspect, provided is a method of preparing and recovering a Heck reaction product, comprising passing aryl or vinyl halide with an alkene in the presence of Pd catalyst through an electrospray to provide an ionized reaction mixture and recovering said reaction product from the ionized reaction mixture.

In a further aspect, provided is a method of preparing and recovering product of elimination comprising passing an organic molecule containing a leaving group through an electrospray to provide an ionized reaction mixture and recovering said reaction product from the ionized reaction mixture.

In a further aspect, provided is a method of preparing and recovering an ester comprising passing an acid and an alcohol through an electrospray to provide an ionized reaction mixture and recovering said reaction product from the ionized reaction mixture.

In an embodiment, the capillary voltage of the electrospray is between 1.0 to 4.0 kV.

In a further embodiment, the capillary voltage of the electrospray is at least 3.0 kV.

In a further embodiment, the capillary voltage of the electrospray is at least 4.0 kV.

In a further embodiment, the cone voltage of the electrospray is less than 100V.

In a further embodiment, the cone voltage of the electrospray is less than 30V.

In a further embodiment, the reaction product is enriched by passing the ionized reaction mixture through a second electrospray.

In a further aspect, provided is a chemical synthesis system comprising: an injector coupled to an electrospray for introducing chemical compounds into the electrospray; and a collection system for receiving chemical compounds expelled by the electrospray; wherein said collection system is in fluid communication with said injector for reintroducing said chemical compounds into the electrospray.

In a further embodiment, the collection system is in fluid communication with a liquid chromatographic apparatus for separation of unreacted chemical compounds and reacted chemical compounds.

In a further embodiment, the liquid chromatographic apparatus is in fluid communication with said injector for transfer of unreacted chemical compounds to said injector for reintroduction into the electrospray.

In a further embodiment, the electrospray is coupled to a mass spectrometer.

DESCRIPTION OF THE FIGURES

(FIG. 17A) to 400° C. despite increasing the cone voltage from 40 volts to 60 volts (example 18).

DETAILED DESCRIPTION OF THE INVENTION

Figure 1:
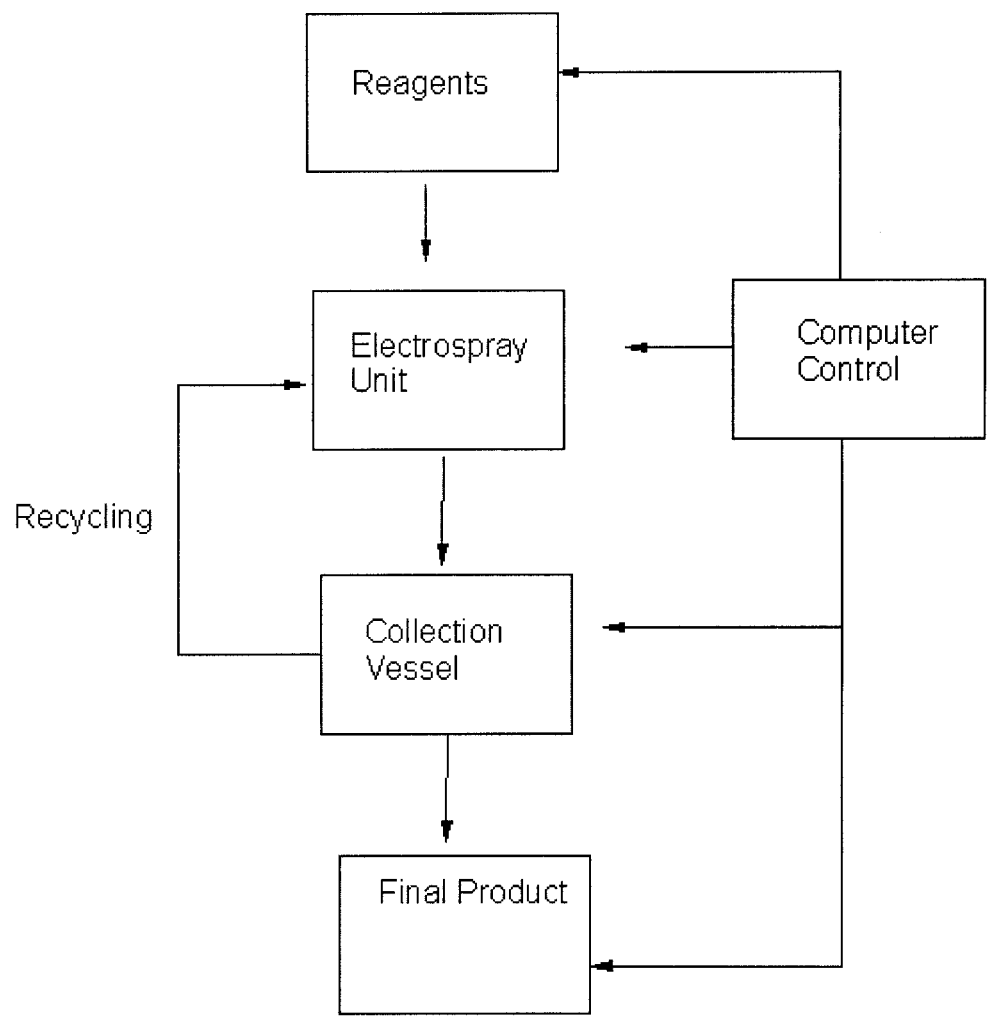
FIG. 1 shows a schematic representation of the electrospray ionization process for use in methods of chemical synthesis.

The possibility of using electrospray for preparatory organic synthesis was discovered during analysis of amino acids in methanol solvent by ES-MS techniques where the corresponding methyl ester products were identified. Interestingly, the reaction between carboxylic acid (amino acid) and alcohol (methanol) functional groups typically requires the presence of a catalyst. In the above ES-MS case, however, no catalyst was required. These results suggest the potential for electrospray techniques to carry out chemical reactions using mild conditions without the need for any catalyst.

Further experimentations showed that electrospray can also expedite other classes of reactions such as amide formation, oxidation, reduction, Schiff base formation, elimination and condensation reactions.

Organic chemistry lies at the centre of the pharmaceutical and chemical industries. Despite enormous advances in the field, however, many chemical reactions are slow, low-yielding, and non-selective. A consequence of these inefficiencies is significant chemical waste, low-productivity, and loss of revenue. The traditional techniques used to accelerate chemical reactions are to apply heat, UV irradiation, and/or to add a catalyst (usually an expensive, toxic metal) to the reaction vessel. In many cases, however, these methods fail to achieve their desired goal. Developing a process that can reduce chemical waste, energy consumption, and reaction by-products would represent a significant advance in the pharmaceutical and chemical industries.

The key innovative aspect of the Electrospray Chemical Synthesizer is to utilize electrospray for chemical synthesis. The reactivity patterns of molecules in the electrospray differ from molecules in the solution phase (where conventional organic synthesis occurs) thereby opening the possibility for improved reactivity profiles.

A scientific basis for using electrospray for chemical synthesis is the observation that chemical reactions can proceed in the electrospray with the possibility of isolating and purifying the desired chemical products, Chemical reactions occurring in the electrospray can be influenced and fine-tuned by a wide range of parameters such as capillary and cone voltages, and source and de-solvation temperatures etc.

The advantages offered by the Electrospray Chemical Synthesizer are a) the ability to synthesize target compounds in a shorter period of time compared to conventional techniques, b) the ability to synthesize target compounds not easily prepared compared by conventional techniques, and c) the elimination of expensive, toxic, metal-based catalysts. Electrospray Chemical synthesis is a part of green chemistry innovation.

The present invention provides a novel method of using electrospray ionization for organic chemical synthesis, and in particular, the synthesis of esters, amide, amines, and alcohol. The present invention further provides an electrospray chemical synthesis system for use in such methods. The presently disclosed methods and electrospray chemical synthesis system provides for the efficient production of organic products as reactions occur in both the electrospray capillary and cone that provide the activation energy for reactions. The electrospray chemical synthesis system can be used for production of chemical compounds from a smaller scale to industrial production. It can be used in a wide range of organic reactions, including but not limited to palladium catalyzed coupling, aldol condensation, esterification, photochemistry, carbon-carbon bond formation, oxidation reduction reactions, protection and deprotection of various functional groups, inorganic compound formations and reactions which would not be possible with conventional techniques.

The disclosed methods and electrospray chemical synthesis system represent a major innovation in green chemistry creating a brand new technology for chemical synthesis. The disclosed methods and electrospray chemical synthesis system have a lower environmental impact compared to conventional synthesis methods as the increase in the efficiency of chemical synthesis allows for diminished quantities of solvents and chemicals and consequentially a reduction in toxic wastes. Reactions which usually have long reaction times and require expensive and toxic catalysts can be completed in a few seconds using the electrospray synthesis method.

The term "electrospray chemical synthesis process" refers to the process of electrospray ionization used to conduct chemical synthesis reactions. In a preferred embodiment, this process is represented schematically in FIG. 1. The process involves introduction of reacting species to the electrospray acting as a chemical synthesizer, optimization of electrospray parameters and collection of the products. The electrospray parameters include capillary voltage, cone voltage, and temperature. The process may be repeated until the starting material is converted completely to the final product. The apparatus can be linked to a computer interface.

The terms "Electrospray Chemical Synthesizer" and "ECS", can be used interchangeably herein, and refer to the device used for electrospray chemical synthesis. The electrospray synthesizer may consist of an injection system, power sources, a collection system and a computer interface. A laser source is used for photo-initiating reactions. The electrospray chemical synthesizer has the capability of introducing multiple reagents into the electrospray source and has the capability of recycling the formed product back to the electrospray if the reaction is not complete during the electrospray process.

Figure 2:
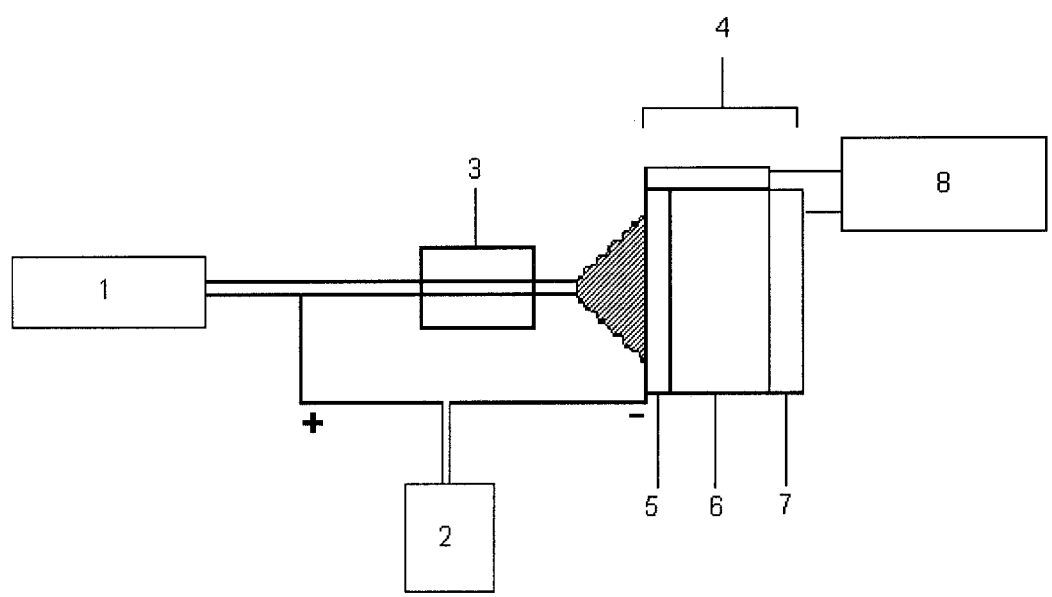
FIG. 2 shows the typical design of an electrospray chemical synthesizer comprising an heated injection system (1), a power source (2), nebulizer (3), collection system (4), laser energizer (5), microwave source (6), orifice ring connected to a secondary power source (7) and a computer interface (8).

The term "electrospray cone" as used herein refers to the locus of chemical bond formation located at tip of the capillary as can be seen in FIG. 2.

The terms "ESI-MS" and "ES-MS", are used interchangeably herein and refer to the electrospray ionization chemical synthesis process followed by mass spectrometry.

The term "electrospray ionization" refers to energizing molecules in the electrospray plume and the resulting energized molecules may or may not be fully ionized.

The terms "bond", "chemical bond" and "chemical linkage", are used interchangeably herein and refer to ionic or covalent interactions, or the like, between atoms and can include, but are not limited to bonds between carbon, oxygen, nitrogen, hydrogen, halogens, metals, silicon, boron, phosphorus, aluminum, selenium, arsenic and sulfur.

Methods of Electrospray Chemical Synthesis

Generally speaking, ester and amide formation are slow and require activation using various catalysts, however no catalyst was required during electrospray and hence electrospray can be used as a mild source of reacting two molecules which would otherwise require harsh conditions. The extent of formation of ester shows dependence on electrospray conditions such as capillary voltage, etc. The ester is formed during the electrospray condition and not in the MS thus providing a novel synthesis method. For example ES-MS of phenylalanine in methanol shows phenylalanine methyl ester and the intensity of the signal is dependent upon the capillary voltage. Phenylalanine dissolved in ethanol shows corresponding ethyl ester signals. It has also been observed that organic acid dissolved in ethylamine also shows the amide formation.

The present inventors are the first to use electrospray ionization for chemical synthesis, and in particular, for the synthesis of esters. The present inventors found that when a solution of corresponding acid was dissolved in an appropriate alcohol and directly infused to the ESI-MS at optimum condition, it was possible to obtain the maximum yield of the ester. From various ESI-MS experiments it was concluded that the formation of ester strongly depends upon the temperature of the source, desolvation temperature, cone voltage, the volume of infusion, and the capillary voltage.

The present invention provides novel methods which utilize electrospray for preparing organic compounds and in particular, esters. As used herein, the term "electrospray chemical synthesis" refers to the process of electrospray ionization used to conduct chemical synthesis reactions. This process is represented schematically in FIG. 1.

It has been determined that by controlling the capillary voltage, cone voltage and desolvation temperature of the electrospray, the synthesis of organic compounds can be optimized. The chemical synthesis may involve the formation of a chemical bond or linkage between reactants to provide a desired product. The terms "bond", "chemical bond" and "chemical linkage", are used interchangeably herein and refer to ionic or covalent interactions, or the like, between atoms and can include, but are not limited to bonds between carbon, oxygen, nitrogen, hydrogen, halogens, metals, silicon, boron, phosphorus, aluminum, selenium, arsenic and sulfur.

In one embodiment, the present invention provides a method of preparing and recovering an oxidation reaction product, comprising passing a reactant through an electrospray to provide an ionized reaction mixture and recovering said reaction product from the ionized reaction mixture.

In another embodiment, the present invention provides a method of preparing and recovering a reduction reaction product, comprising passing a reactant through an electrospray to provide an ionized reaction mixture and recovering said reaction product from the ionized reaction mixture.

In another embodiment, the present invention provides a method of preparing and recovering an aldol condensation reaction product comprising passing an enol compound and a carbonyl compound through an electrospray to provide an ionized reaction mixture and recovering said reaction product from the ionized reaction mixture.

In another embodiment, the present invention provides a method of preparing and recovering an amide comprising passing a carboxylic acid and an amine through an electrospray to provide an ionized reaction mixture and recovering said amide from the ionized reaction mixture.

In another embodiment, the present invention provides a method of preparing and recovering a secondary amine comprising passing a nitro compound through an electrospray to provide an ionized reaction mixture and recovering said secondary amine from the ionized reaction mixture.

In another embodiment, the present invention provides a method of preparing and recovering an imine comprising passing an amine, and an aldehyde through an electrospray to provide an ionized reaction mixture and recovering imine from the ionized reaction mixture.

In one embodiment, the present invention provides a method of preparing and recovering an alkyl amine, comprising passing an amine and an alkyl halide through an electrospray to provide an ionized reaction mixture and recovering said reaction product from the ionized reaction mixture.

In another embodiment, the present invention provides a method of preparing and recovering reaction product resulting from the hydrolysis of an ester comprising passing an ester and alcohol through an electrospray to provide an ionized reaction mixture and recovering said reaction product from the ionized reaction mixture.

In another embodiment, the present invention provides a method of preparing and recovering a mono or diacetal comprising passing an aldehyde and alcohol through an electrospray to provide an ionized reaction mixture and recovering said mono or di-acetal from the ionized reaction mixture.

In another embodiment, the present invention provides a method of preparing and recovering a ketal comprising passing a ketone and alcohol through an electrospray to provide an ionized reaction mixture and recovering said monoor di-ketal from the ionized reaction mixture.

In another embodiment, the present invention provides a method of preparing and recovering a carboxylic acid comprising passing an ester through an electrospray to provide an ionized reaction mixture and recovering said alcohol and carboxylic acid from the ionized reaction mixture.

In another embodiment, the present invention provides a method of preparing and recovering an oxidation product comprising passing an aldehyde or alcohol through an electrospray to provide an ionized reaction mixture and recovering said carboxylic acid from the ionized reaction mixture.

In another embodiment, the present invention provides a method of preparing and recovering a reaction product resulting from the alkyation of an amine, comprising passing an amine and alkyl halide through an electrospray to provide an ionized reaction mixture and recovering said reaction product from the ionized reaction mixture.

In another embodiment, the present invention provides a method of preparing and recovering a Suzuki reaction product, comprising passing aryl- or vinyl-boronic acid with an aryl- or vinyl-halide, in the presence of a Pd catalyst through an electrospray to provide an ionized reaction mixture and recovering said reaction product from the ionized reaction mixture.

In another embodiment, the present invention provides a method of preparing and recovering a Heck reaction product, comprising passing an alkene with an aryl or alkenyl halide, in the presence of a Pd catalyst through an electrospray to provide an ionized reaction mixture and recovering said reaction product from the ionized reaction mixture.

It will be appreciated that the choice of reactants will depend on the desired reaction product. As compared to conventional synthesis methods, the use of expensive and/or toxic catalysts is not required. In general, the desired reactants will be dissolved in a suitable solvent, passed through the electrospray and the resulting ionized reaction mixture collected and the desired reactant collected.

The synthesis of the desired reaction product is influenced by adjusting the capillary voltage of the electrospray, the cone voltage of the electrospray and the desolvation temperature. The optimum ionization conditions can be readily determined by conducting small scale reactions using an electrospray coupled to a mass spectrometer to monitor the resulting products. By determining the optimum ionization conditions, the large scale production is implemented using the electrospray chemical synthesizer system discussed in greater detail below. In another embodiment, the inside of the capillary can be coated with an immobilized catalyst for assisting the desired chemical reaction.

The desired reaction product can be recovered from the ionization reaction mixture using conventional methods known in the art such as liquid chromatographic methods. The concentration of the desired reaction product can be enriched by collecting the ionization reaction mixture and passing the reaction mixture through a second electrospray to catalyze the reaction of previously unreacted compounds. This step can be repeated multiple times to maximize recovery of the desired product.

In another embodiment, the present invention provides a preparing and recovering an ester comprising passing an acid and an alcohol through an electrospray to provide an ionized reaction mixture and recovering said reaction product from the ionized reaction mixture. It will be appreciated that the choice of the acid and the alcohol will depend on the desired end product. As discussed above, the optimum ionization conditions can be determined by conducting small scale reactions using an electrospray coupled to a mass spectrometer to monitor the resulting products.

In preferred embodiments of the method, esterification is maximized when the capillary voltage of the electrospray are relatively high as compared to values used during analytical applications. The capillary voltage of the electrospray is preferably between 1 and 4.0 mV. In a further preferred embodiment, the capillary voltage of the electrospray is 3.0 mV. In a still more preferred embodiment, the capillary voltage of the electrospray is 4.0 mV.

In preferred embodiments of the method, esterification is maximized when the cone voltage of the electrospray will be relatively high as compared to values used during analytical applications. The cone voltage of the electrospray is preferably less than 40 V. In a further preferred embodiment, the cone voltage of the electrospray less than 30 V.

The methods of the present invention can be practiced using conventional electrosprays known in the art. For improved efficiency and ease of use, an automated chemical synthesis system can be employed. The chemical synthesis system can comprise an injector coupled to an electrospray for introducing chemical compounds into the electrospray; and a collection system for receiving chemical compounds expelled by the electrospray. To allow for maximum product yield, unreacted compounds can be recycled back to the electrospray for ionization. The chemical synthesis system can be configured so that the collection system is in fluid communication with the injector so that unreacted compounds can be reintroduced into the electrospray. The chemical synthesis system can be controlled with a computer interface which controls the injection of chemical compounds into the electrospray, the operation of the electrospray and the recycling of unreacted compounds.

An example of an electrospray chemical synthesizer system which can be used to practice the methods of the present invention is shown in FIG. 2. In one embodiment, the electrospray chemical synthesizer system comprises a heated injection system (1), a power source (2), nebulizer (3), collection system (4), laser energizer (5), microwave source (6), orifice ring connected to a secondary power source (7) and a computer interface (8).

In a further embodiment the injection system can comprises a gravitational or pump driven syringe capable of delivering powder and/or liquid samples to an electrode of tubular, porous flow-through, planar flow-by, porous flow or other configuration for optimal efficiency. The power source preferably source comprises power supply capable of generating potential difference of several kilovolts. The electrical configuration of electrospray chemical synthesizer can be a grounded or floated system.

In use, the desired chemical reactants are transferred into the injection system and permitted to interact. The contents of the injection system are then expelled through the electrospray capillary while they are subjected to power sources permitting the formation of the spray which exits the electrospray cone. The capillary can be made of metal or inorganic polymeric or other conducting material of different bore size. The spray can be subjected to microwave and laser for additional energizing source. The spray is then free to contact a collection system for recovery of the desired product. The collection system can comprise an enclosed vessel capable of isolating the product in an inert or evacuated environment.

In further embodiments of the invention, the collection system may be coupled with means for separating reacted and unreacted compounds. For example, the collection system may be in fluid communication with a liquid chromatographic apparatus capable of separating the collected ionization mixture into discrete fractions. Fractions containing the desired end product can be directed to a storage vessel and fractions containing unreacted compounds can be redirected to the injection system for reintroduction into the electrospray for repeated ionization. In further embodiments of the invention, chemical synthesis system may include a mass spectrometer for real time analysis of the chemical synthesis to ensure that the desired product is being produced.

Although the invention has been described with reference to illustrative embodiments, it is to be understood that the invention is not limited to these precise embodiments, and that various changes and modification are to be intended to be encompassed in the appended claims.

EXAMPLES

Example 1

Figure 3A:
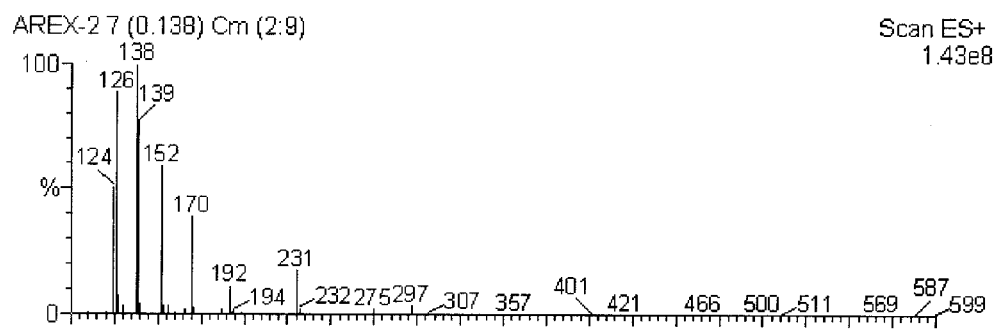
FIGS. 3A, 3B, and 3C show ESI-MS Spectra of 2-pyridylacetic acid in methanol at different capillary voltage. The signal corresponding to methyl ester increases as the capillary voltage is increased from +1 kV to +4 kV (example 1).

Electrospray Chemical Synthesis with Variable Capillary Voltage 8.8 mg of 2-pyridylacetic acid hydrochloride was dissolved in 19.72 ml of methanol and ES-MS spectrum were generated at a constant cone voltage of 30V and a variety of capillary voltage values, more specifically 1.00, 3.00 and 4.00 kV, as can be seen in FIGS. 3A, B and C, respectively. The esterification process is favored at high capillary voltage. ESI-MS experiments also show that at higher cone voltage both the ester and the acid disintegrate.

Example 2

Figure 4A:
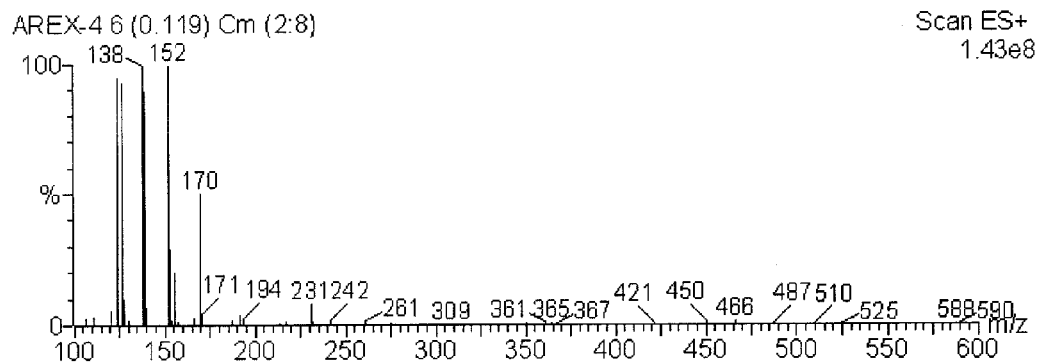
FIGS. 4A, 4B, and 4C show ESI-MS Spectra of 2-pyridylacetic acid in methanol at constant high capillary voltage (3 kV) but different cone voltage (example 2).
Figure 4B:
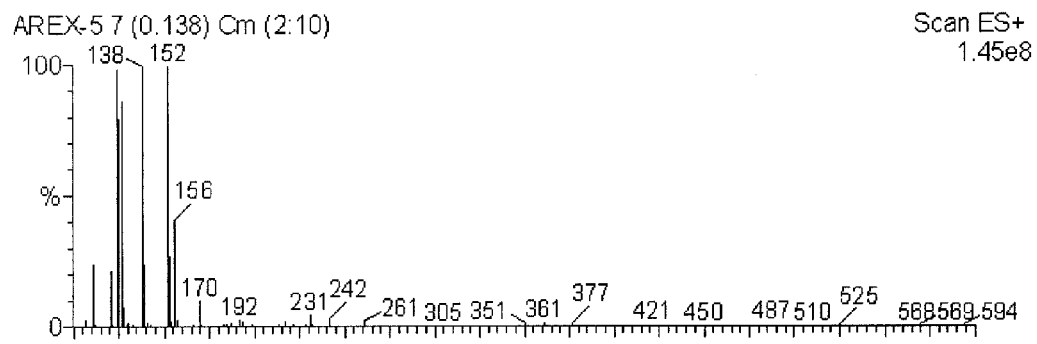
Figure 4C:
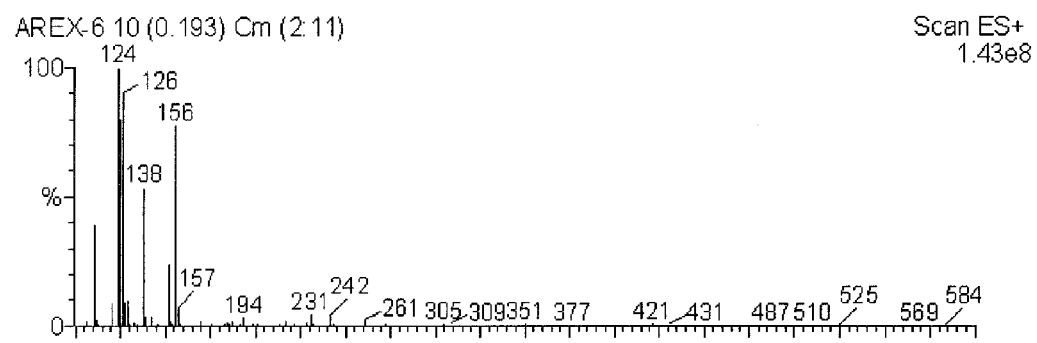

Electrospray Chemical Synthesis with Variable Cone Voltage 8.8 mg of 2-pyridylacetic acid hydrochloride was dissolved in 19.72 ml of methanol and ESI-MS spectrum were generated at a constant capillary voltage of 3.00 kV and a variety of cone voltage values, more specifically 40, 60 and 80 V, as can be seen in FIGS. 4A, B and C, respectively. Both esters and acid disintegrate at high cone voltage (>40 V).

Example 3

Figure 3B:
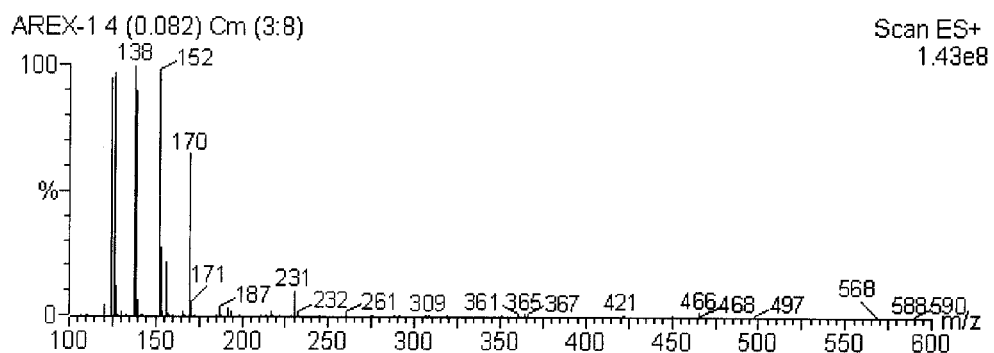
Figure 3C:
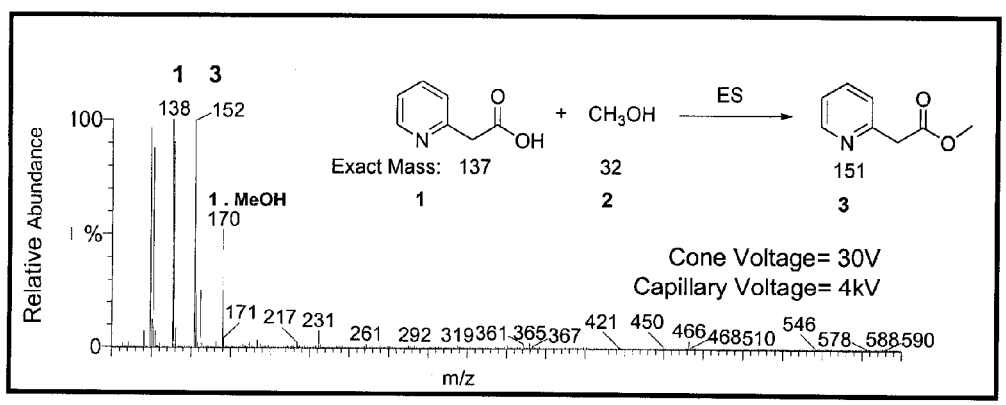
Figure 5A:
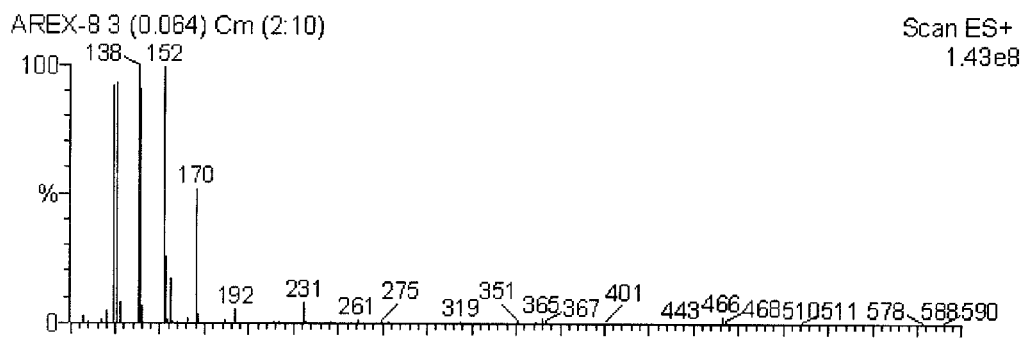
FIGS. 5A, 5B, and 5C show ESI-MS Spectra of 2-pyridylacetic acid in methanol containing trifluoroacetic acid at different capillary voltage (example 3).
Figure 5B:
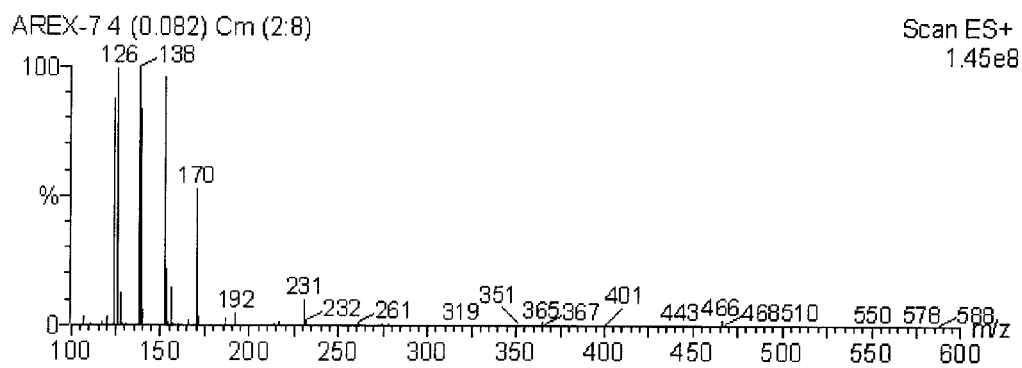
Figure 5C:
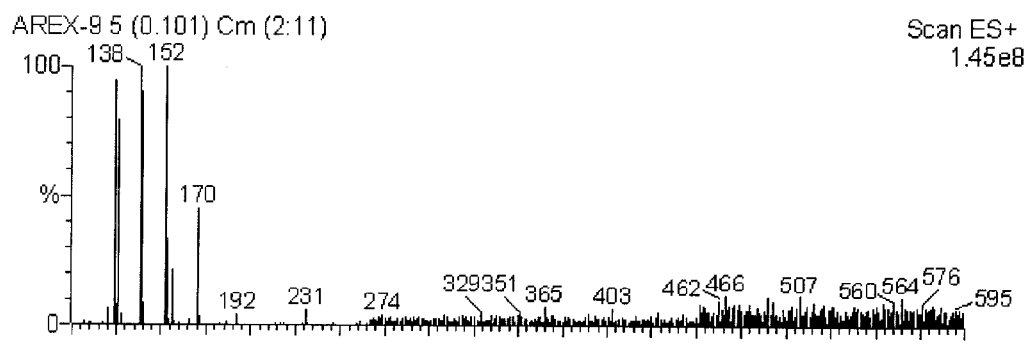

Electrospray Chemical Synthesis with Variable Capillary Voltage in the Presence of TFA 8.8 mg of 2-pyridylacetic acid hydrochloride was dissolved in 19.72 ml of methanol and ESI-MS spectrum were generated at a constant cone voltage of 40 V and a variety of capillary voltage values, more specifically 1.00, 3.00 and 5.00 kV, in the presence of TFA, as can be seen in FIGS. 5A, B and C, respectively. Acids are commonly used as a catalyst for reactions between acid and alcohol. The acid showed improvement in the formation of esters. Thus ester signal relative to acid at 1 kV was increased in presence of TFA (FIG. 5) compared to absence of TFA (FIG. 3) at 1 kV. Thus addition of trifluoroacetic acid catalyst showed only slight improvement in the formation of the ester product.

Example 4

Figure 6A:
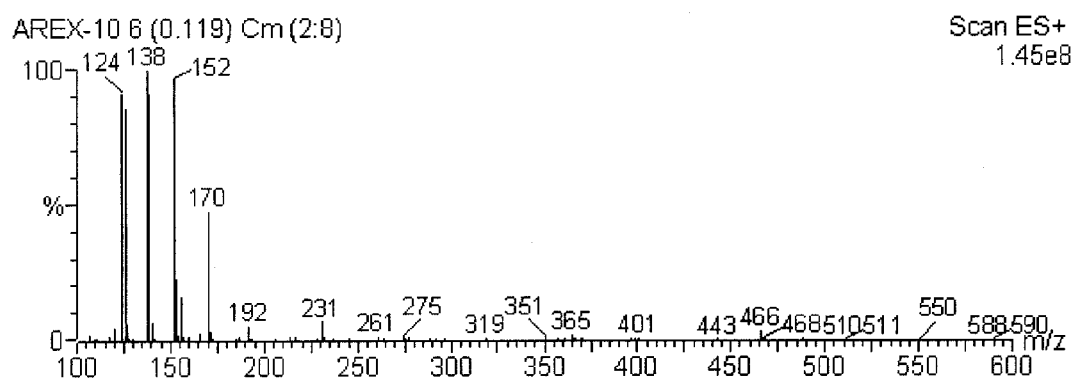
FIGS. 6A, 6B, and 6C show ESI-MS Spectra of 2-pyridylacetic acid in methanol containing trifluoroacetic acid at fixed capillary voltage but different cone voltage (example 4).
Figure 6B:
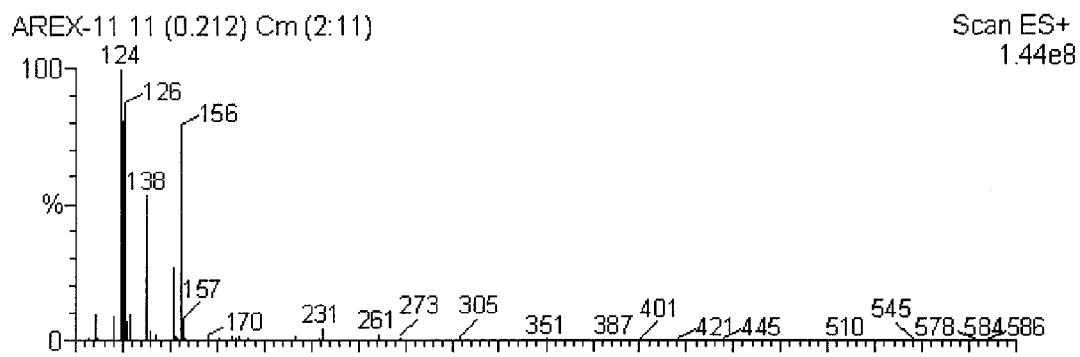
Figure 6C:
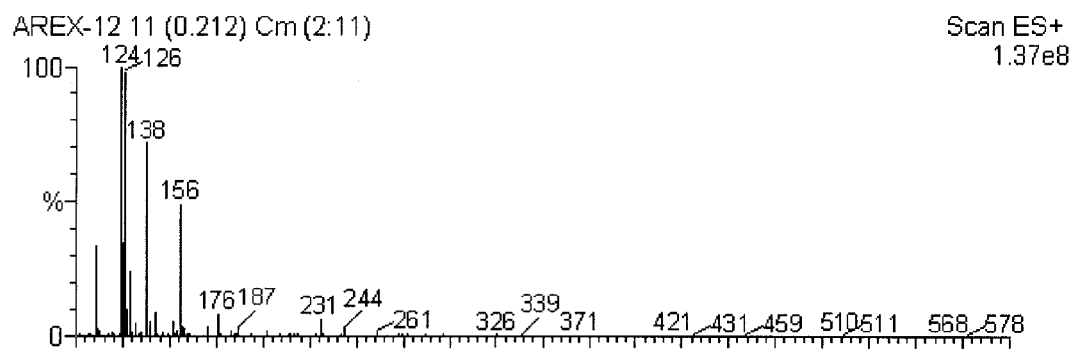

Electrospray Chemical Synthesis with Variable Cone Voltage in the Presence of TFA 8.8 mg of 2-pyridylacetic acid hydrochloride was dissolved in 19.72 ml of methanol and ESI-MS spectrum were generated at a constant capillary voltage of 3.00 kV and a variety of cone voltage values, more specifically 30, 80 and 100 V, in the presence of TFA, as can be seen in FIGS. 6A, B and C, respectively. Acids are commonly used as a catalyst for reactions between acid and alcohol. The results showed that presence of a catalyst did not improve the production of an ester at a high cone voltage.

Example 5

Figure 7A:
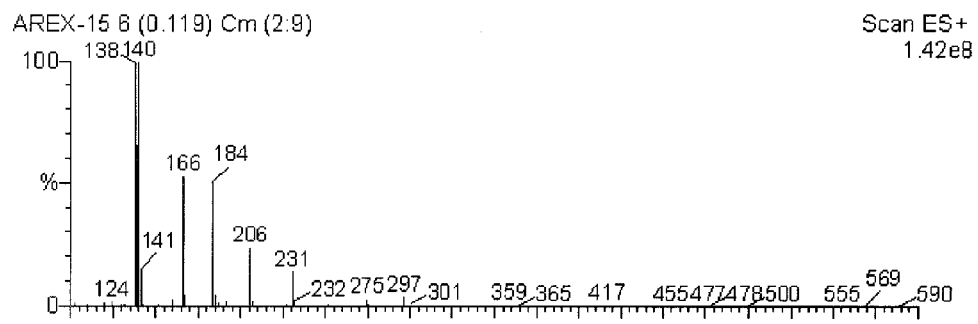
FIGS. 7A, 7B, and 7C show ESI-MS Spectra of 2-pyridylacetic acid hydrochloride in ethanol at fixed cone but different capillary voltage (example 5).
Figure 7B:
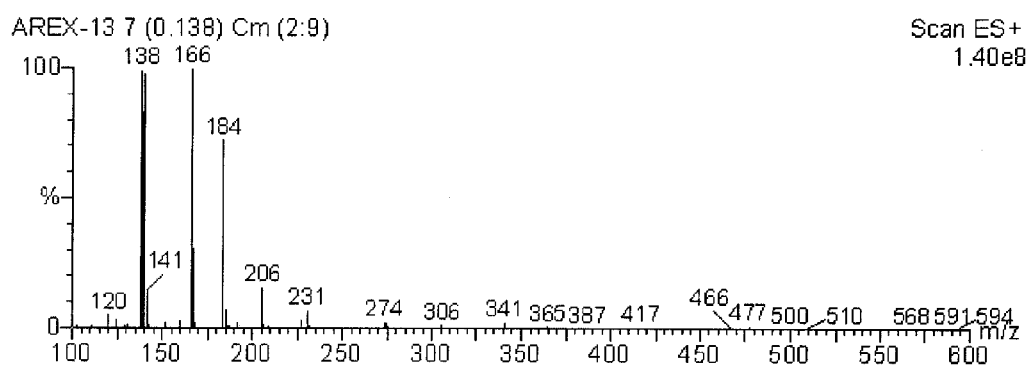
Figure 7C:
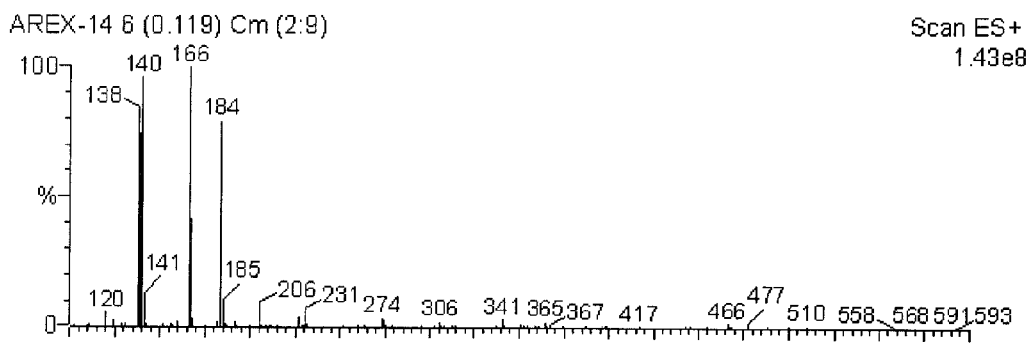

Electrospray Chemical Synthesis with Variable Capillary Voltage in the Presence of Ethanol 8.8 mg of 2-pyridylacetic acid hydrochloride was dissolved in 19.72 ml of methanol and ESI-MS spectrum were generated at a constant cone voltage of 40 V and a variety of capillary voltage values, more specifically 1.00, 3.00 and 5.00 kV, in the presence of ethanol, as can be seen in FIGS. 7A, B and C, respectively. Protonated 2-pyridalacetic acid gives signal at 138 (n+1) while 2-pyridalacetic acid ethyl ester shows the corresponding signal at 166 (n+1). The signal corresponding to ethyl ester increases as the capillary voltage is increased from +1 kV to +4 kV.

Example 6

Figure 8A:
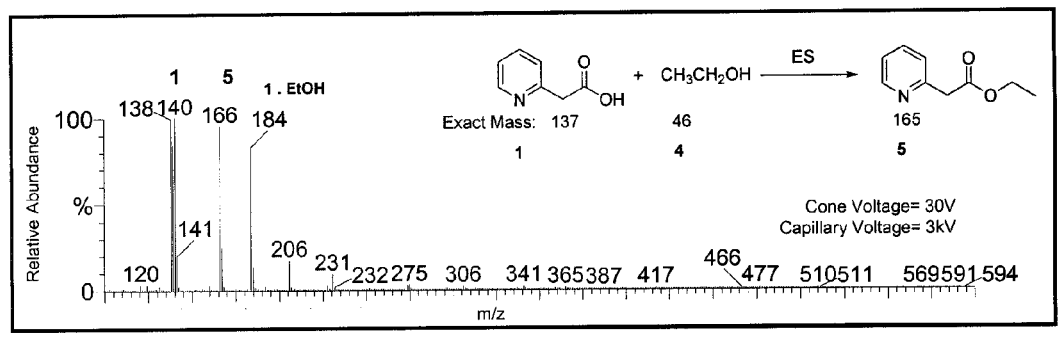
FIGS. 8A, 8B, 8C, and 8D show ESI-MS Spectra of 2-pyridylacetic acid in ethanol at constant high capillary voltage (3 kV) but different cone voltage (example 6).
Figure 8B:
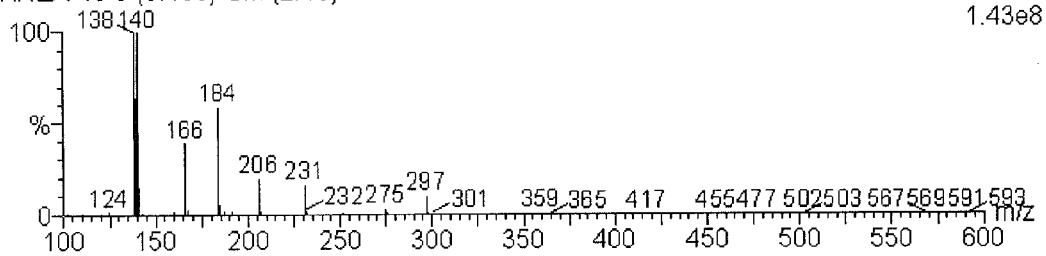
Figure 8C:
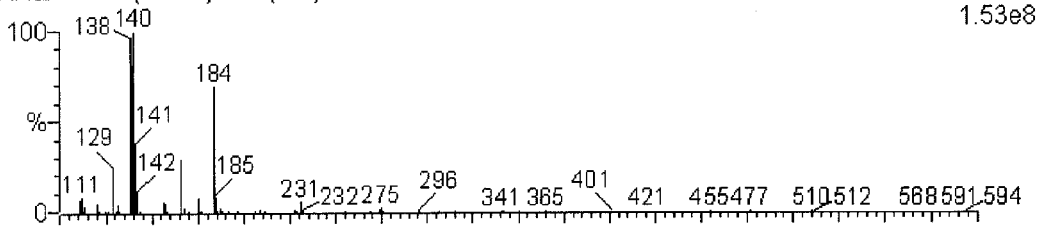
Figure 8D:
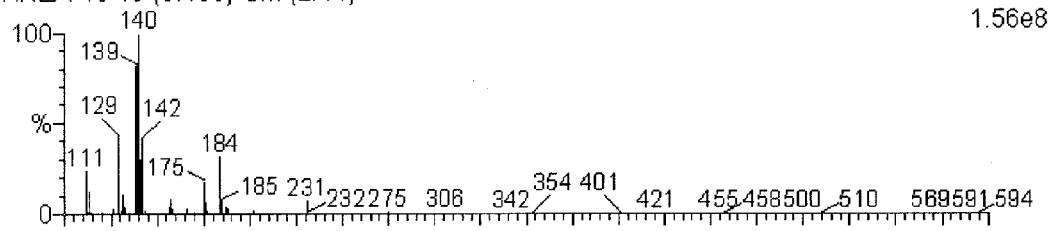
Figure 9A:
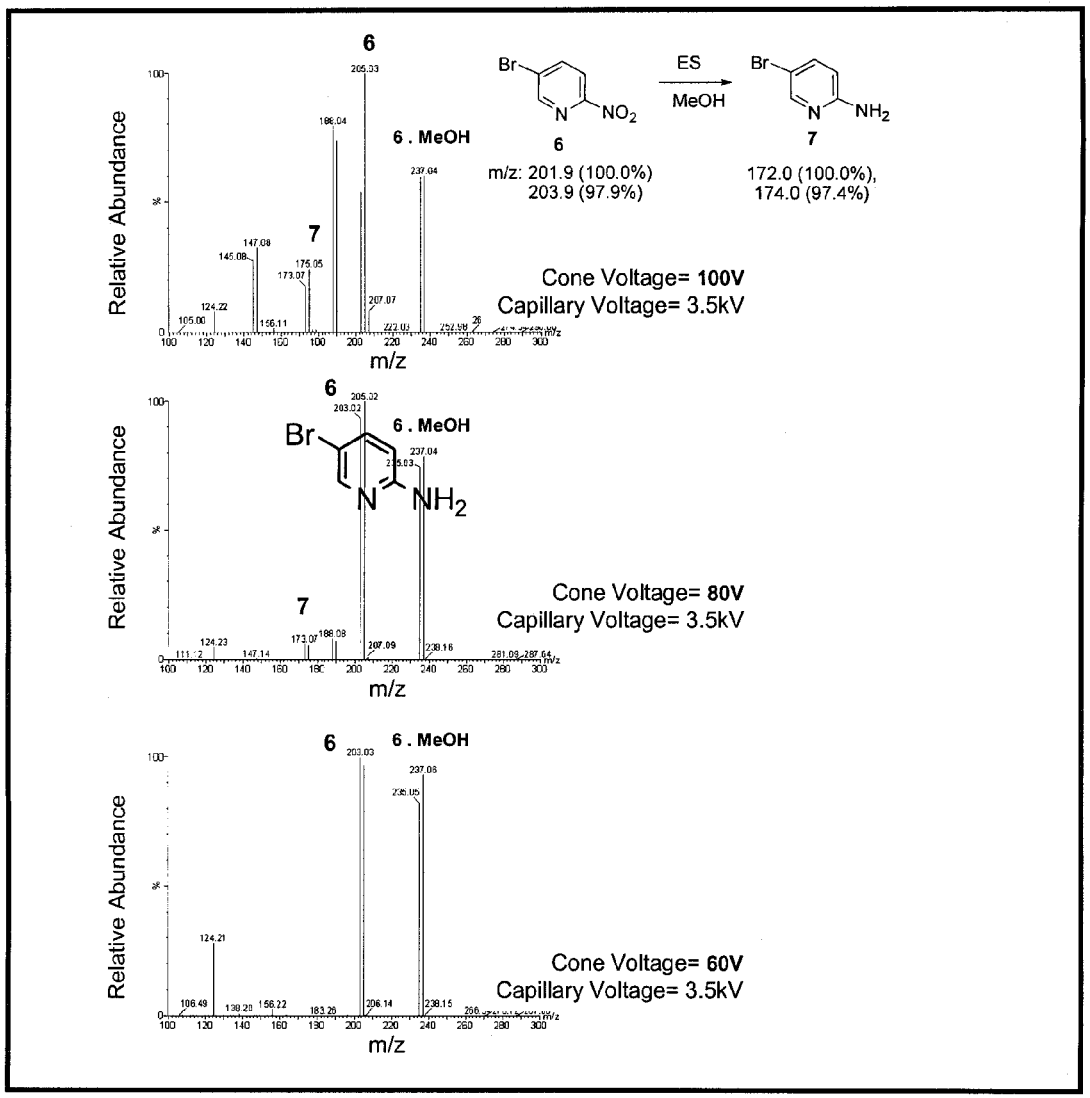
FIG. 9A shows ESI-MS (positive mode) of 5-bromo-2-nitropyridine showing the formation of amine from a nitro group at high cone voltage (example 11).
Figure 9B:
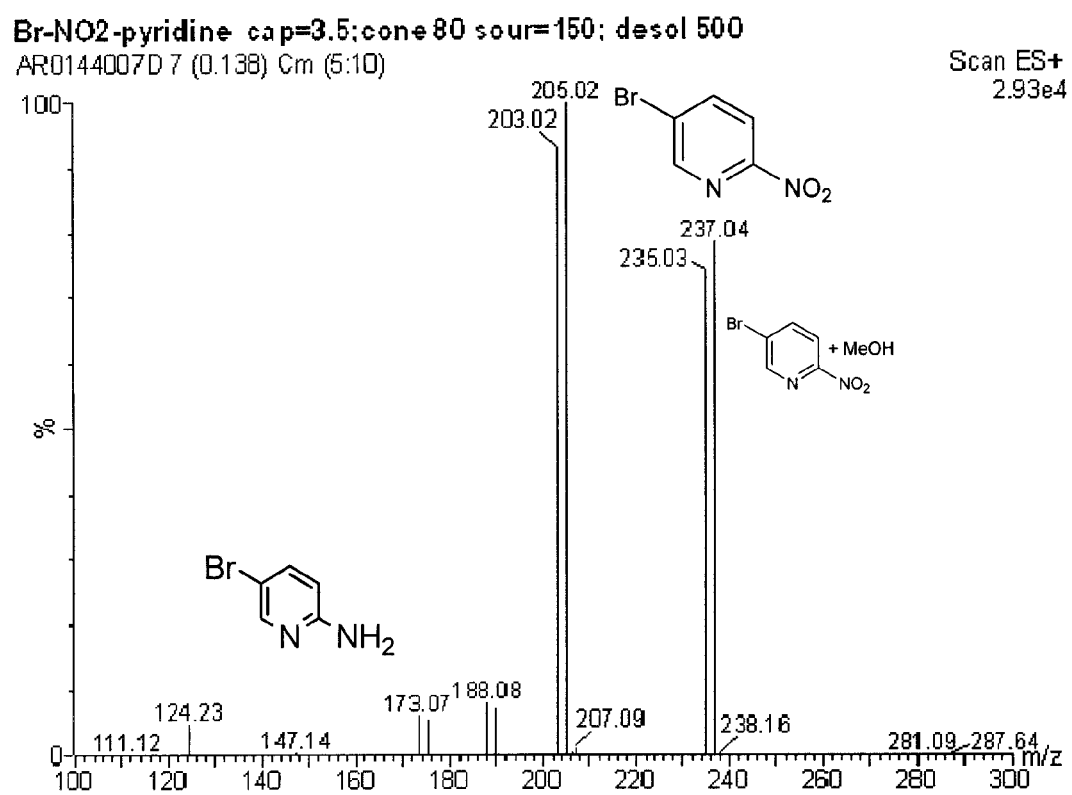
FIG. 9B shows ESI-MS (positive mode) of 5-bromo-2-nitropyridine showing a decrease in the formation of an amine from a nitro group as the cone voltage is reduced from 100 V (FIG. 9A) to 80V (example 11).
Figure 9C:
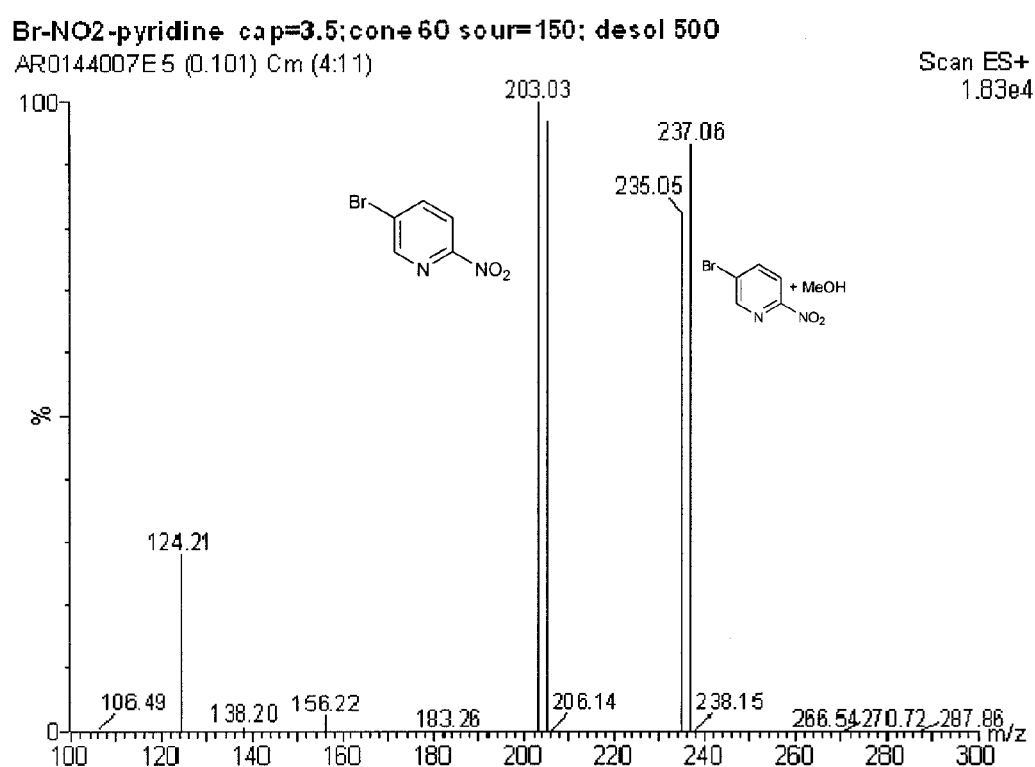
FIG. 9C shows ESI-MS (positive mode) of 5-bromo-2-nitropyridine showing no amine formation from a nitro group at a cone voltage of 60V indicating that the reduction of the nitro group occurs at a cone voltage greater than 60 volts (example 11).
Figure 9D:
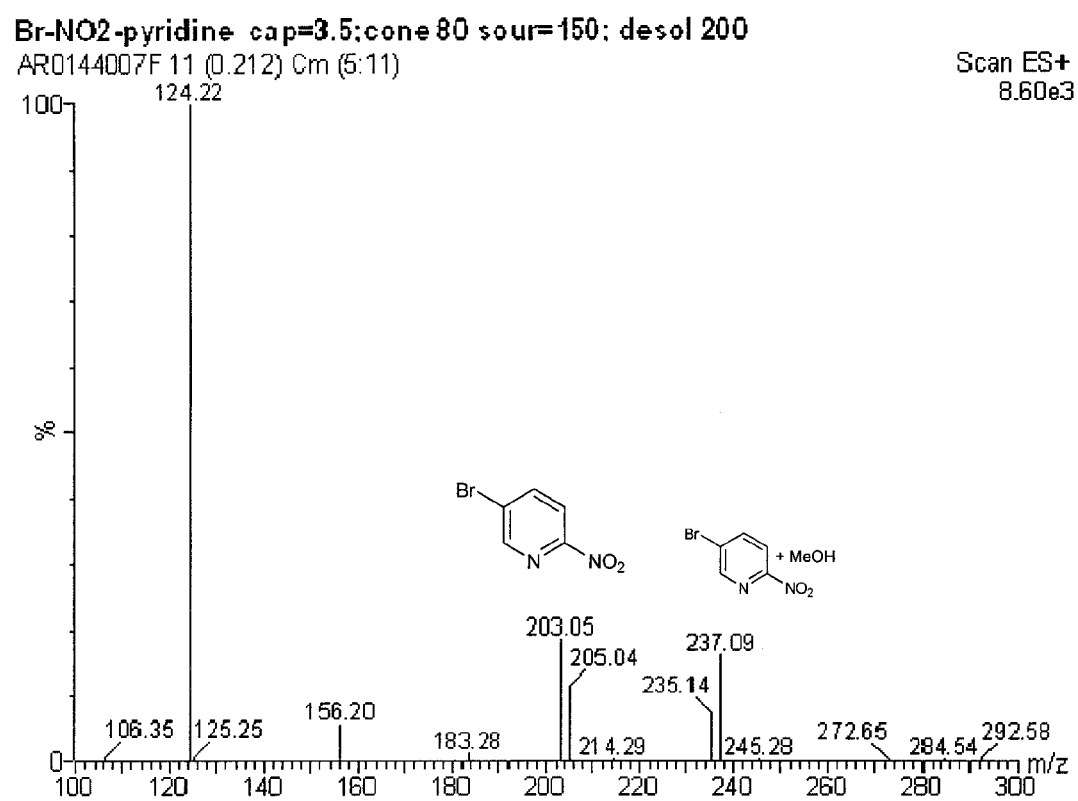
FIG. 9D shows ESI-MS (positive mode) of 5-bromo-2-nitropyridine showing no amine formation as the desolvation temperature is lowered from 500° C. to 200° C. demonstrating the importance of the desolvation temperature on reduction of the nitro group (example 11).
Figure 9E:
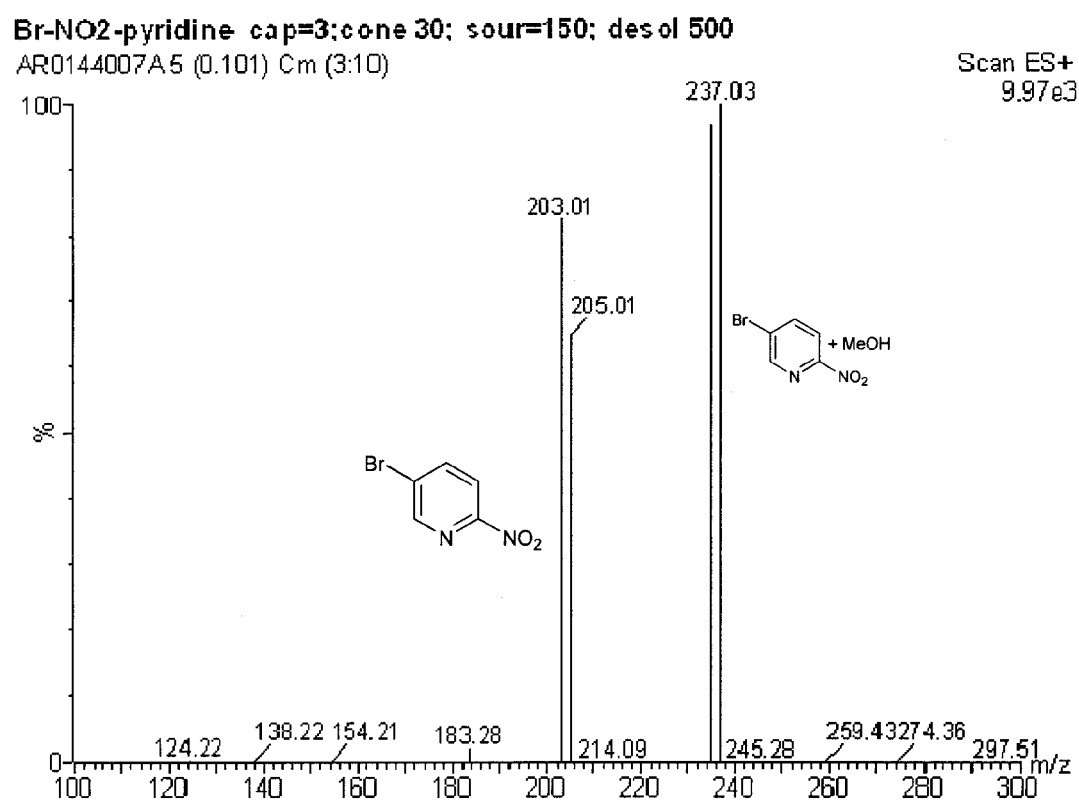
FIG. 9E shows ESI-MS (positive mode) of 5-bromo-2-nitropyridine showing no amine formation from a nitro group at a cone voltage of 30V but at higher source temperature (150° C.) indicating that the source temperature has a comparatively minor role in the reduction of a nitro group compared to desolvation temperature and cone voltage (example 11).
Figure 9F:
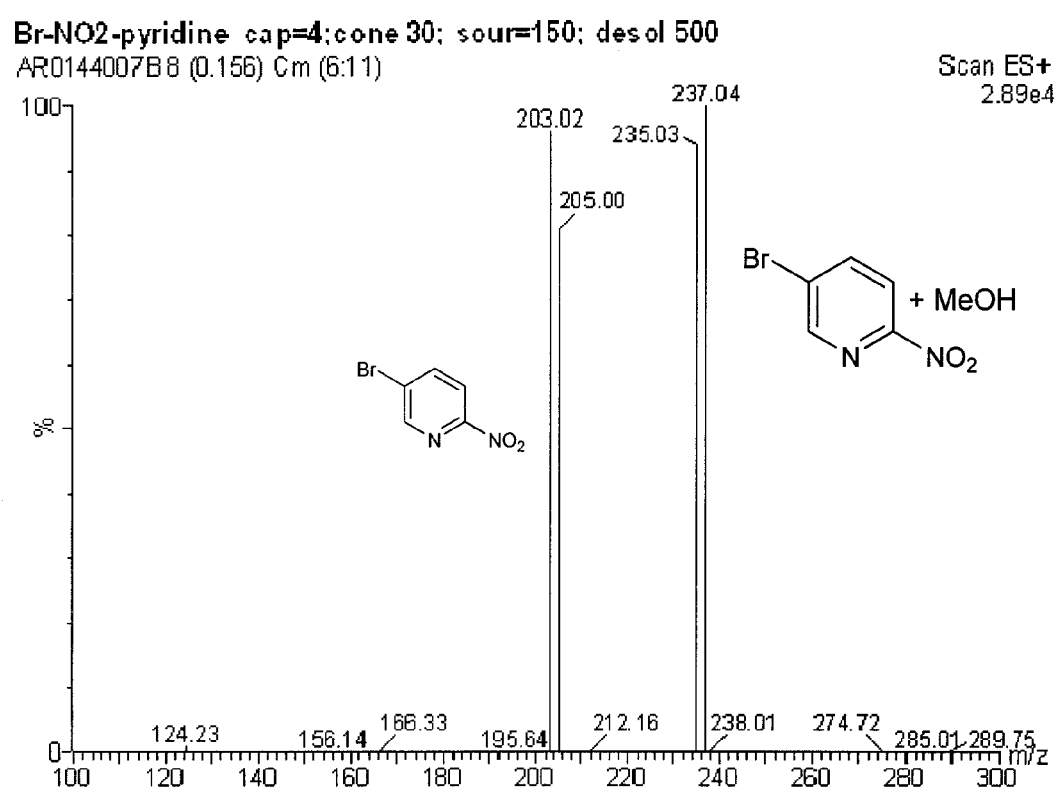
FIG. 9F shows ESI-MS (positive mode) of 5-bromo-2-nitropyridine showing no amine formation from a nitro group at a cone voltage of 30V but at higher source temperature (150° C.) and capillary voltage (4.0 KV) showing that source temperature and capillary voltage have minor role in reduction compared to the desolvation temperature and cone voltage (example 11).

Electrospray Chemical Synthesis with Variable Cone Voltage in the Presence of Ethanol 8.8 mg of 2-pyridylacetic acid hydrochloride was dissolved in 19.72 ml of methanol and ESI-MS spectrum were generated at a constant capillary voltage of 3.00 kV and a variety of cone voltage values, more specifically 30, 40, 80 and 100 V, in the presence of ethanol, as can be seen in FIGS. 8A, B, C and D, respectively. Ethyl esters decompose at high cone voltage (>40 V).

Example 7

Formation of Methyl Ester by Electrospray Ionization

A stock solution was prepared by dissolving 2-pyridyl acetic acid hydrochloride (8.8 mg) in 20 ml of methanol. A portion of the above stock solution was placed in a 250 µL Hamilton gas tight syringe. The solution was infused at the rate of 10 µL/min to Micromass Quattro Ultima ES-MS system using a Harvard syringe pump. A signal corresponding to the 2-pyridyl acetic acid methyl ester was observed at 152 (n+1) along with 2-pyridyl acetic acid at 138 (n+1) and a 1:1 complex of 2-pyridyl acetic acid-methanol at 170 (n+1). The experiment was also conducted using 2-pyridylacetic acid hydrochloride in methanol and TFA solution to observe the effect of acid catalysis on the formation of the ester in the electrospray. The maximum intensity of the signal corresponding to the ester was at the following conditions: Cone voltage=30 volts and capillary voltage 4 KV.

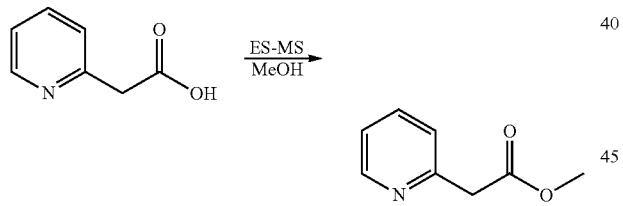

Example 8

Formation of Ethyl Ester by Electrospray Ionization

A stock solution was prepared by dissolving 2-pyridyl acetic acid hydrochloride (8.4 mg) in 21 ml of anhydrous ethanol. A portion of the above stock solution was placed in a 250 µL Hamilton gas tight syringe. The solution was infused at the rate of 10 µL/min into a Micromass Quattro Ultima ES-MS system using a Harvard syringe pump. A signal corresponding to the 2-pyridyl acetic acid ethyl ester was observed at 166 (n+1) along with 2-pyridyl acetic acid at 138 (n+1) and a 1:1 complex of 2-pyridyl acetic acid-ethanol at 184 (n+1). The maximum intensity of the signal corresponding to the ethyl ester was at the following conditions: Cone voltage=30 volts and capillary voltage 3 KV.

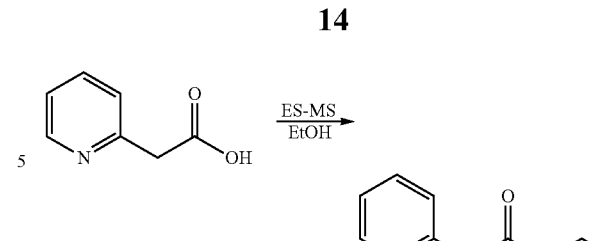

Example 9

Formation and Disproportion of Esters by Electrospray Ionization

A stock solution was prepared by dissolving 2-pyridyl acetic acid hydrochloride (6 mg) in 3.4 ml of 2-propanol. A portion of the above stock solution was placed in a 250 µL Hamilton gas tight syringe. The solution was infused at the rate of 10 µL/min into a Micromass Quattro Ultima ES-MS system using a Harvard syringe pump. A signal corresponding to the 2-pyridyl acetic acid isopropyl ester was observed at 180 (n+1) along with 2-pyridyl acetic acid at 138 (n+1) and 2-pyridyl acetic acid methyl ester at 152 (n+1) (FIG. 9).

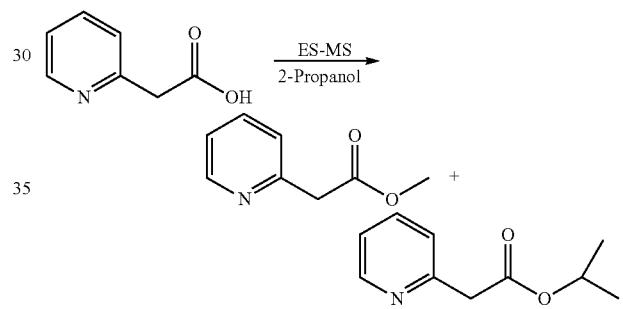

Example 10

Formation and Disproportion of Esters by Electrospray Ionization

Figure 11A:
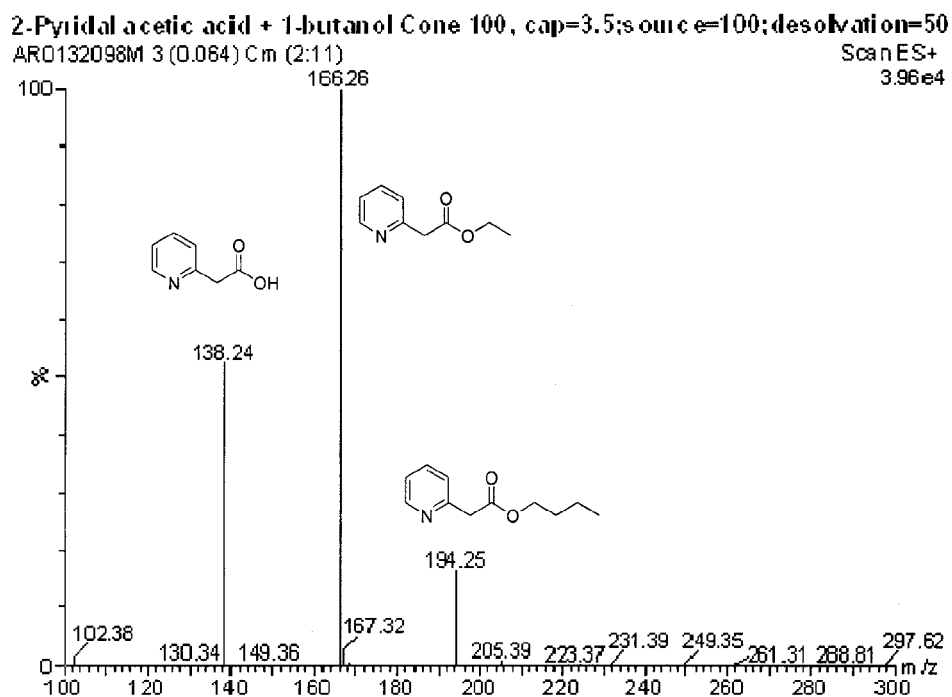
FIG. 11A shows ESI-MS (positive mode) of ethyl and butyl ester formed from 2-pyridyl acetic acid and butanol in the electrospray at a high cone voltage (100V) (example 10).
Figure 11B:
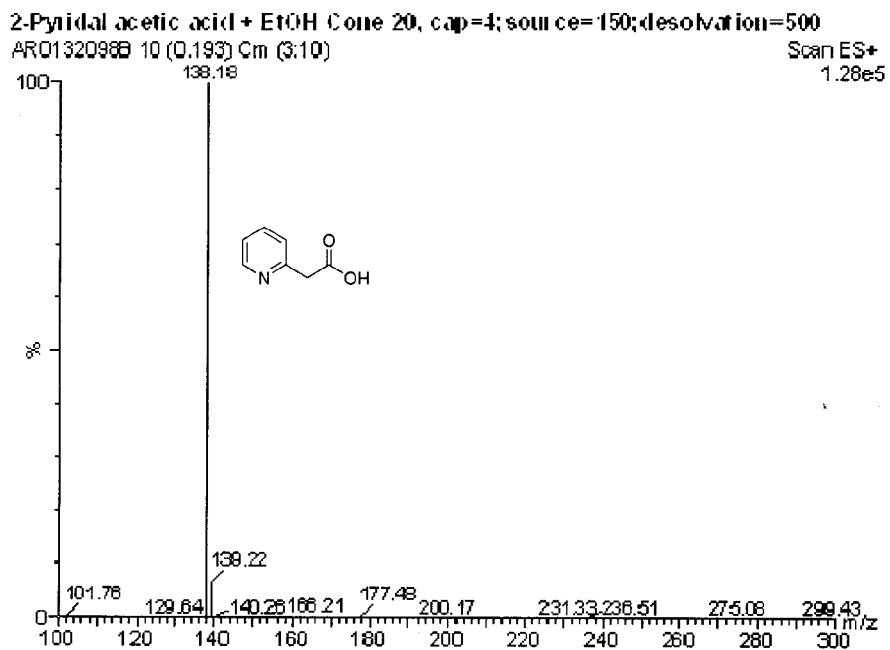
FIG. 11B shows ESI-MS (positive mode) of 2-pyridyl acetic acid in butanol. No ester formation is seen at a cone voltage of 20V (example 10).
Figure 12:
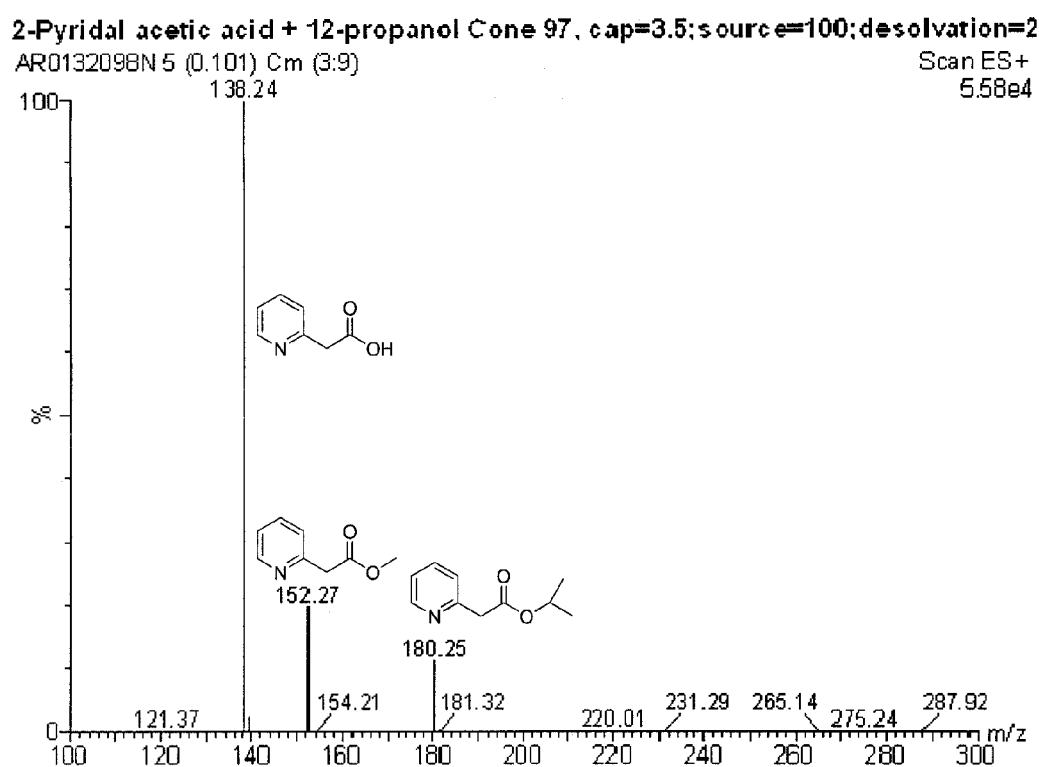
FIG. 12 shows ESI-MS (positive mode) of methyl and 2-propanol ester from 2-pyridyl acetic acid and 2-propanol in the electrospray at a high cone voltage (94V) (example 9).

A stock was prepared by dissolving 2-pyridyl acetic acid hydrochloride (3.5 mg) in 3 ml of 1-butanol. A portion of the above stock solution was placed in a 250 µL Hamilton gas tight syringe. The solution was infused at the rate of 10 µL/min into a Micromass Quattro Ultima ES-MS system using a Harvard syringe pump. A signal corresponding to the 2-pyridyl acetic acid butyl ester was observed at 194 (n+1) along with 2-pyridyl acetic acid at 138 (n+1) and 2-pyridyl acetic acid methyl ester at 166 (n+1) (FIG. 11).

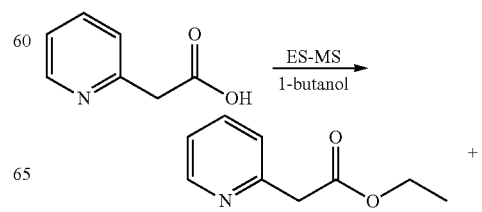

-continued

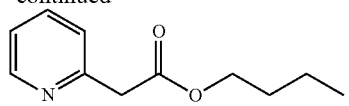

Example 11

Reduction Reaction by Electrospray Ionization

A stock solution was prepared by dissolving 5-bromo-2-nitropyridine (7 mg) in 5.2 ml of methanol. A portion of the above stock solution was placed in a 250 μL Hamilton gas tight syringe. The solution was infused at the rate of 10 μL/min into a Micromass Quattro Ultima ES-MS system using a Harvard syringe pump. Formation of a product showed a strong dependence on ES conditions such as cone voltage, source temperature and desolvation temperature. A signal corresponding to the 5-bromo-2-aminopyridine was observed at 173 and 175 (n+1) and along with 5-bromo-2-nitropyridine at 203 and 205 (n+1) and 235; 237 (n+MeOH+1).

The product was observed at the following conditions; Capillary voltage=3.5; cone voltage=100; source temperature=150° C.; and desolvation temperature=500° C.

The reduction product has signals at 173 and 175 along with the starting material 203 and 205. (The signal at 188 and 190 is the reduced intermediate.)

Decreasing cone voltage from 100 to 60 volt completely abolished reduced product. The spectra of this example can be seen in FIG. 9.

Example 12

Aldol Condensation by Electrospray Ionization

Figure 10:
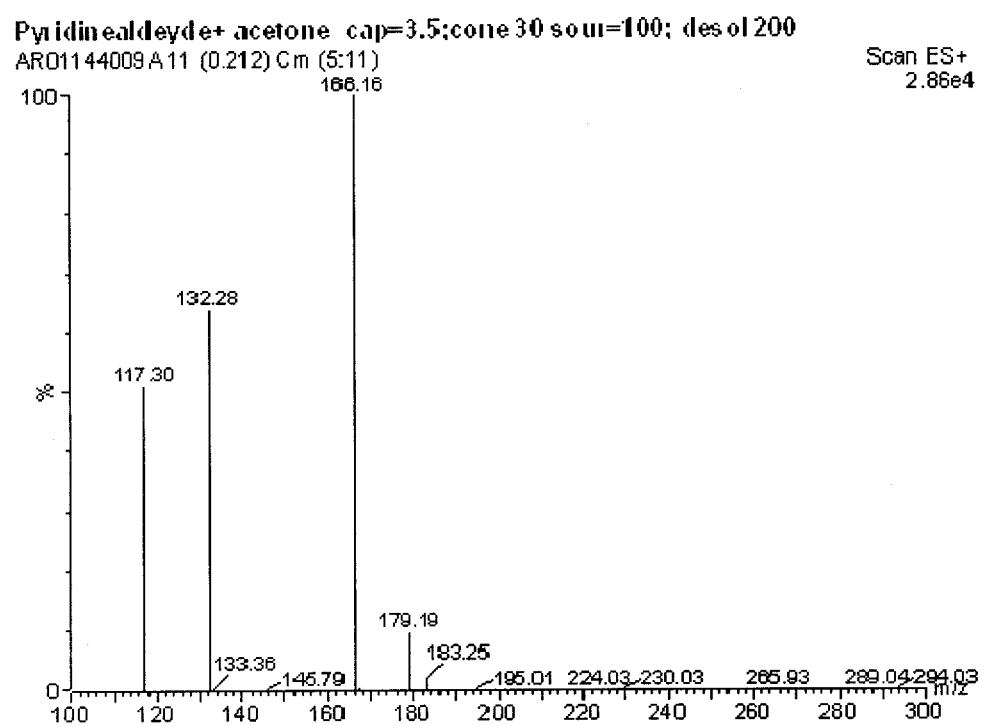
FIG. 10 shows ESI-MS (positive mode) of an aldol formed from the reaction of 4-pyridinecarboxaldehyde with acetone in the electrospray (example 12).

A stock solution was prepared by dissolving 4-pyridinecarboxaldehyde (9 mg) in 4.5 ml of acetone. A portion of the above stock solution was placed in a 250 μL Hamilton gas tight syringe. The solution was infused at the rate of 10 μL/min into a Micromass Quattro Ultima ES-MS system using a Harvard syringe pump. Formation of product was strongly dependent on ES conditions such as cone voltage, source temperature and desolvation temperature. A signal corresponding to the 4-hydroxy-4-(pyridin-4-yl)butan-2-one was observed at 166 (n+1). The signal due to the product disappear at capillary voltage below 3.5 KV (FIG. 10).

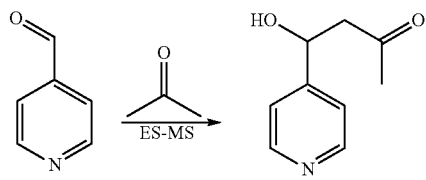

Example 13

Catalysis by Electrospray Ionization

Figure 13A:
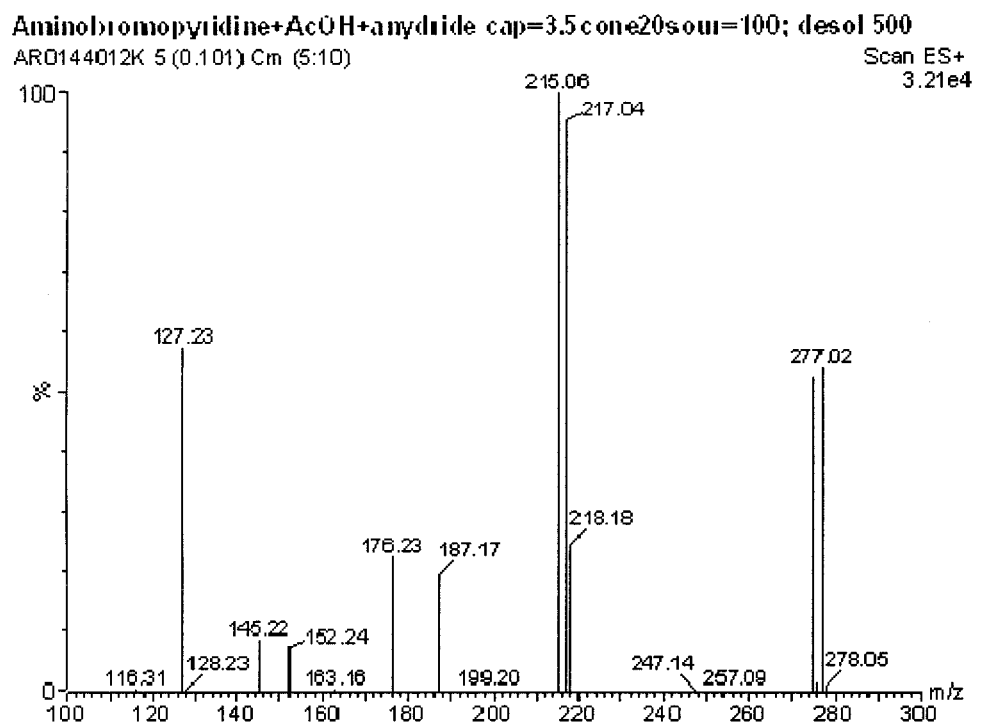
FIG. 13A shows ESI-MS (positive mode) formation of an amide bond from 2-amino-5-bromopyridine and acetic anhydride in the electrospray. The signals at 214 and 216 are due to the product while signals at 214 and 216 are due to 2-amino-5-bromopyridine and acetic anhydride adduct (example 13).
Figure 13B:
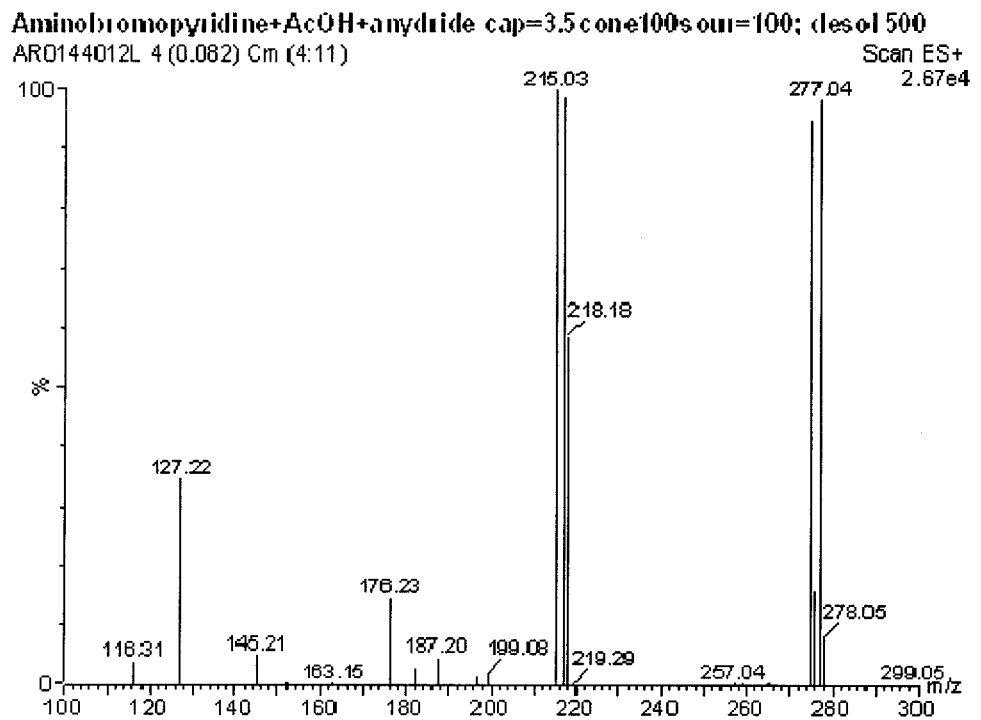
FIG. 13B shows ESI-MS (positive mode) formation of an amide bond from 2-amino-5-bromopyridine and acetic anhydride in the electrospray. The signals at 214 and 216 are due to the product while signals at 214 and 216 are due to 2-amino-5-bromopyridine and the acetic anhydride adduct. The signal due to the adduct is enhanced at high cone voltage formation (example 13).

A stock solution was prepared by dissolving 2-amino-5-bromopyridine (13 mg) in a mixture of acetic acid (3.05 g) and acetic anhydride (3.14 g). A portion of the above stock solution was placed in a 250 μL Hamilton gas tight syringe. The solution was infused at the rate of 10 μL/min into a Micromass Quattro Ultima ES-MS system using a Harvard syringe pump. Formation of product was strongly dependent on ES conditions such as cone voltage, source temperature and desolvation temperature. Formation of the product showed strong dependence on ES conditions such as cone voltage, source temperature and desolvation temperature. A signal corresponding to the N-(5-bromopyridin–2-yl)acetamide was observed at 215 and 217 (n+1) along with 1:1 complex of 2-amino-5-bromopyridine and acetic acid at 275 and 277 (n+1). The ratio of the N-(5-bromopyridin–2-yl)acetamide and 1:1 complex of 2-amino-5-bromopyridine and acetic acid was strongly dependent upon cone voltage, capillary voltage, source temperature, and desolvation temperature. The spectra of this example can be seen in FIG. 13.

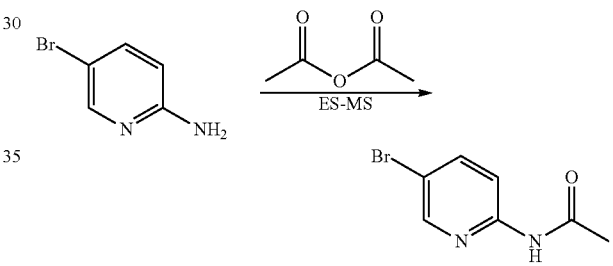

Example 14

Amide Formation by Electrospray Ionization

Figure 14A:
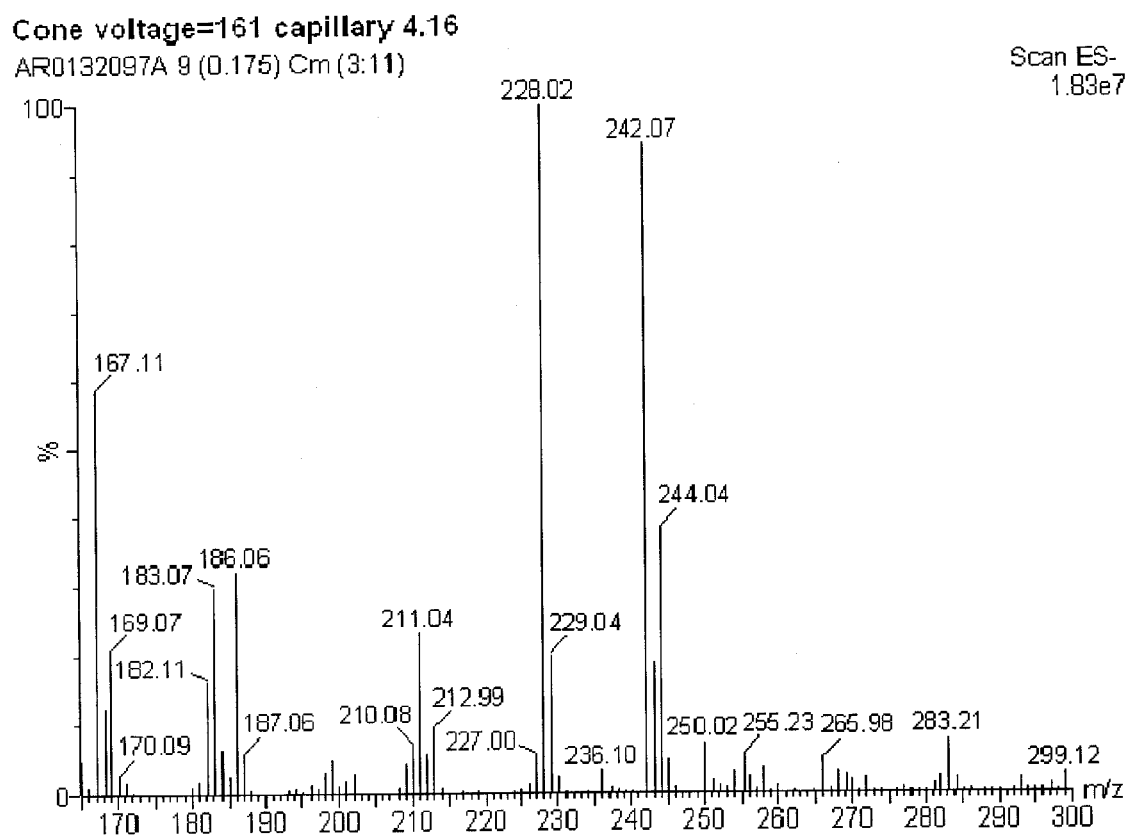
FIG. 14A shows ESI-MS (negative mode) formation of an amide bond from (2S)-2-amino-3-(4-(hydroxyhydrophosphoryl)phenyl)propanoic acid and diethylamine in the electrospray. The signal at 283 is due to the product formed at a high voltage (161 V) (example 14).
Figure 14B:
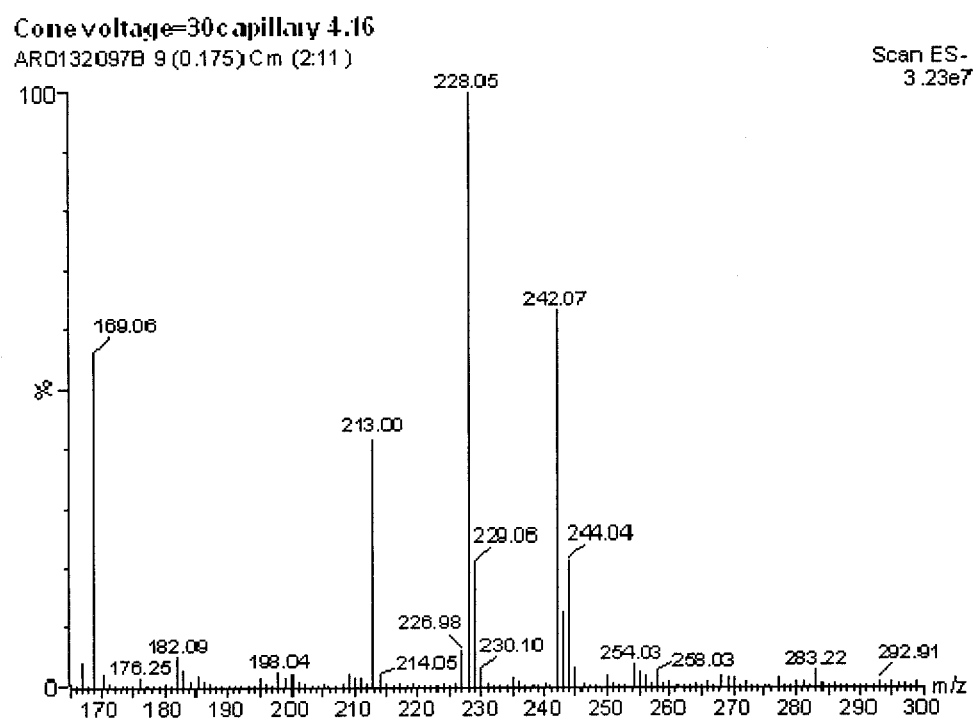
FIG. 14B shows ESI-MS (negative mode) formation of an amide bond from (2S)-2-amino-3-(4-(hydroxyhydrophosphoryl)phenyl)propanoic acid and diethylamine in the electrospray. The product signal intensity at 283.2 is decreased as the cone voltage is lowered from 161 volts (FIG. 14A) to 30 volts (example 14).

A stock solution was prepared by dissolving a mixture of (2S)-2-amino-3-(4-(hydroxyhydrophosphoryl)phenyl)propanoic acid and (2S)-2-amino-3-(4-(hydroxyhydrophosphoryl)phenyl)propanoic acid methyl ester in an aqueous solution of diethylamine. A portion of the above stock solution was placed in a 250 μL Hamilton gas tight syringe. The solution was infused at the rate of 10 μL/min into a Micromass Quattro Ultima ES-MS system using a Harvard syringe pump. Formation of the product showed strong dependence on ES conditions such as cone voltage, source temperature and desolvation temperature. A signal corresponding to the 4-((S)-2-amino-3-(diethylamino)-3-oxopropyl)phenylphosphinic acid was observed at 183 (n−1) along with (2S)-2-amino-3-(4-(hydroxyhydrophosphoryl)phenyl)propanoic acid at 228 (n−1). This is an example of catalysis of amide formation by electrospray. The spectra for this example can be seen in FIG. 14.

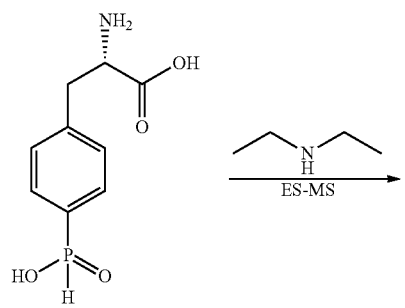

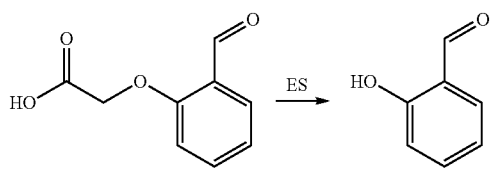 [SMILES: O=Cc1ccccc1OCC(=O)O ; O=Cc1ccccc1O]

Example 15

Hydrolysis of Esters by Electrospray Ionization

Figure 15A:
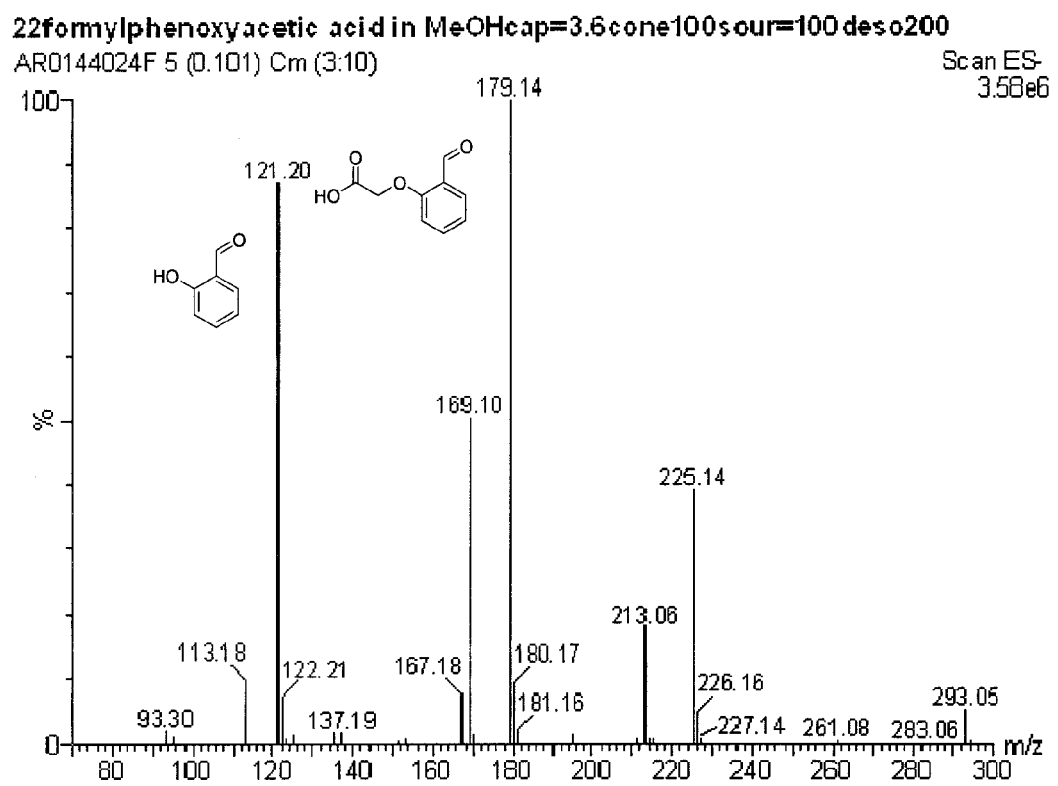
FIG. 15A shows ESI-MS (negative mode) hydrolysis of an ester from 3-formyl phenoxyacetic acid in the electrospray. The hydrolysis is favored at a high cone voltage (100 volts) (example 15).
Figure 15B:
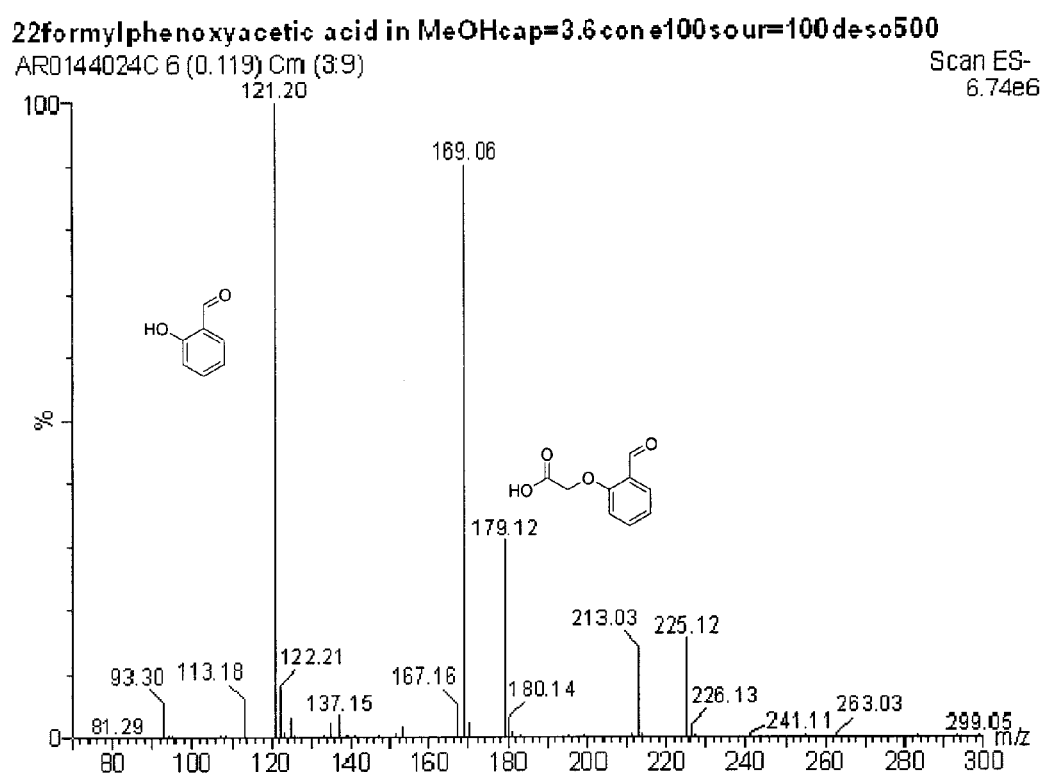
FIG. 15B shows ESI-MS (negative mode) hydrolysis of an ester from 3-formyl phenoxyacetic acid in the electrospray. The hydrolysis product is increased as the desolvation temperature is also increased from 200° C. to 500° C. Thus hydrolysis is favored at a high desolvation temperature and high cone voltage (example 15).
Figure 15C:
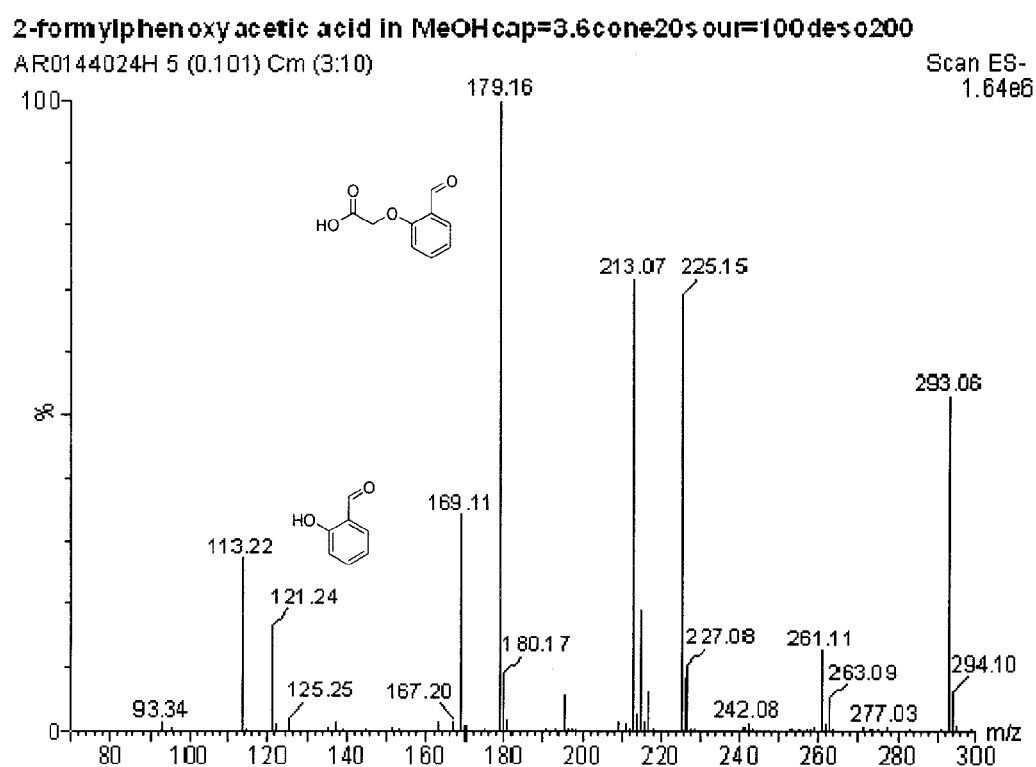
FIG. 15C shows ESI-MS (negative mode) of hydrolysis of an ester from 3-formyl phenoxyacetic acid in the electrospray. The hydrolysis signal is decreased as the cone voltage is lowered to 20 V and desolvation temperature is 200° C. (example 15).
Figure 16A:
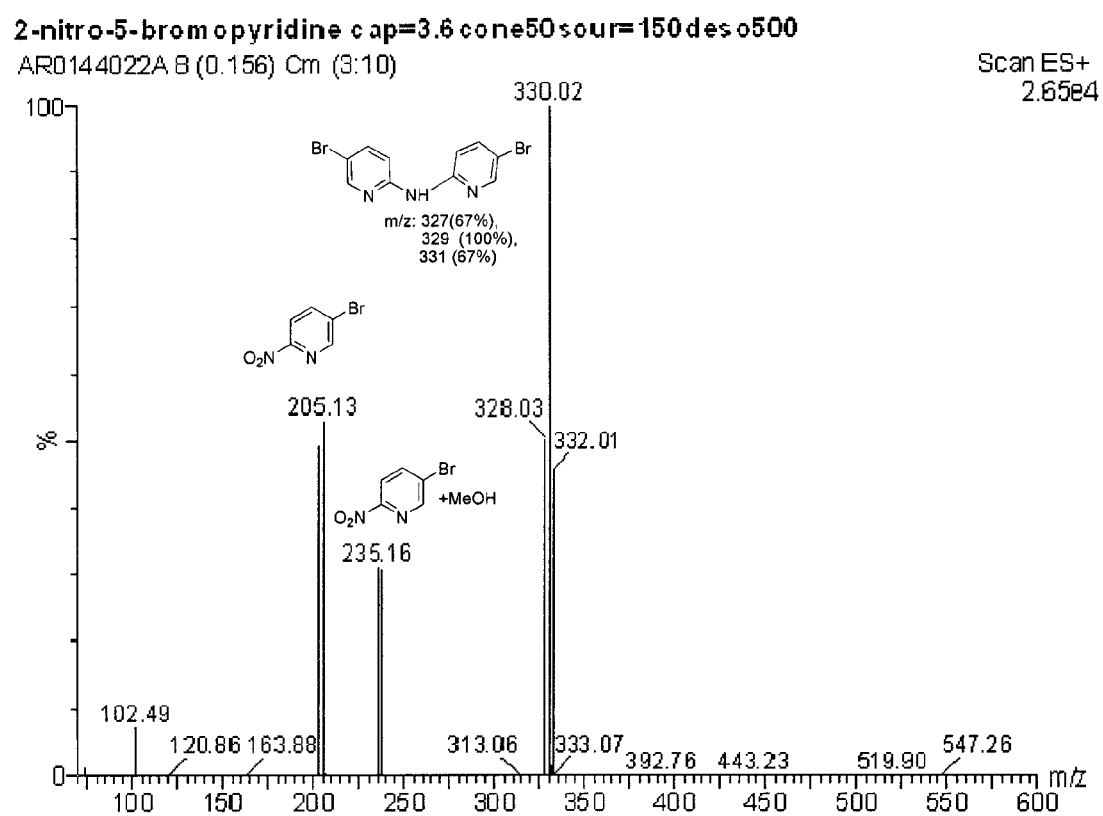
FIG. 16A shows ESI-MS (positive mode) of the formation bis(5-bromopyridin–2-yl)amine from 2-nitro 5-bromo pyridine in the electrospray (example 16).
Figure 16B:
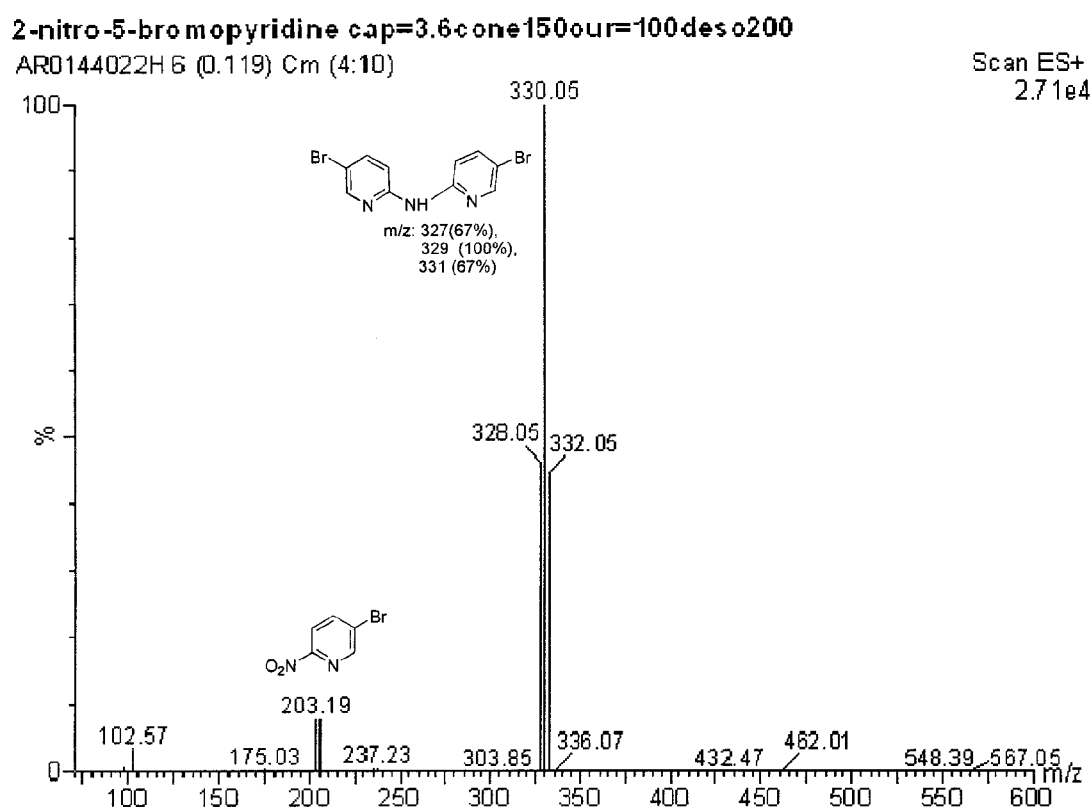
FIG. 16B shows ESI-MS (positive mode) of the formation bis(5-bromopyridin–2-yl)amine from 2-nitro 5-bromo pyridine in the electrospray. The product is increased as cone voltage is increased from 50 volts (FIG. 16A) to 150 volts (example 16).
Figure 16C:
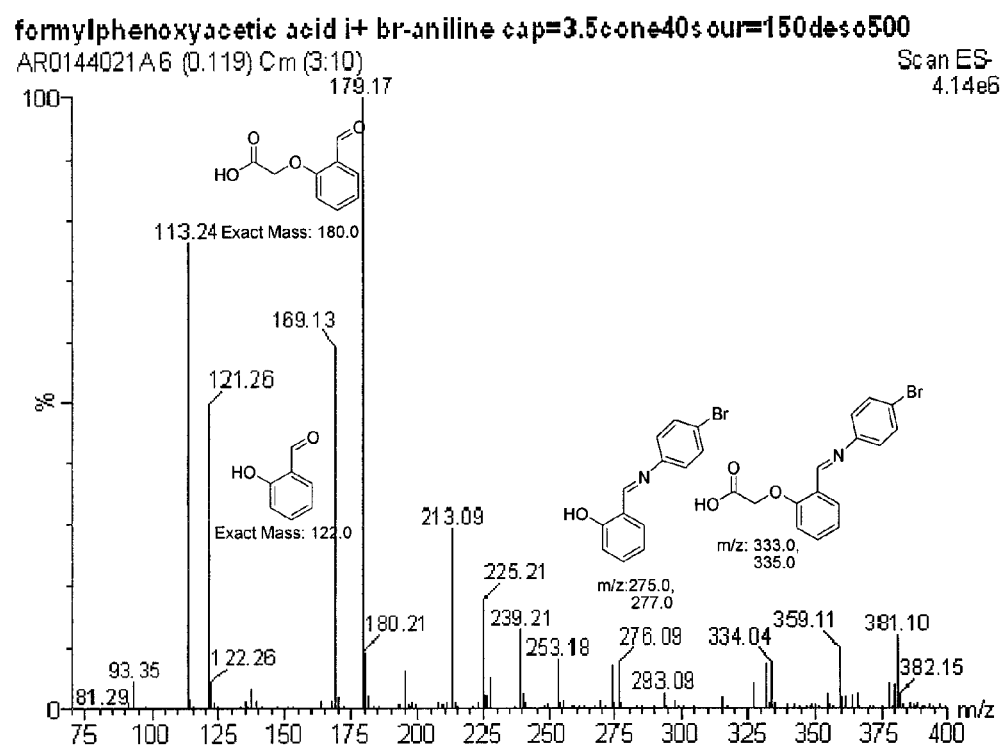
FIG. 16C shows ESI-MS (negative mode) of the formation of an imine from the reaction of 4-bromoaniline and 2-formyl phenoxyacetic acid in the electrospray. The hydrolyzed product of both the imine product and 2-formyl phenoxyacetic acid is also seen (example 16).
Figure 16D:
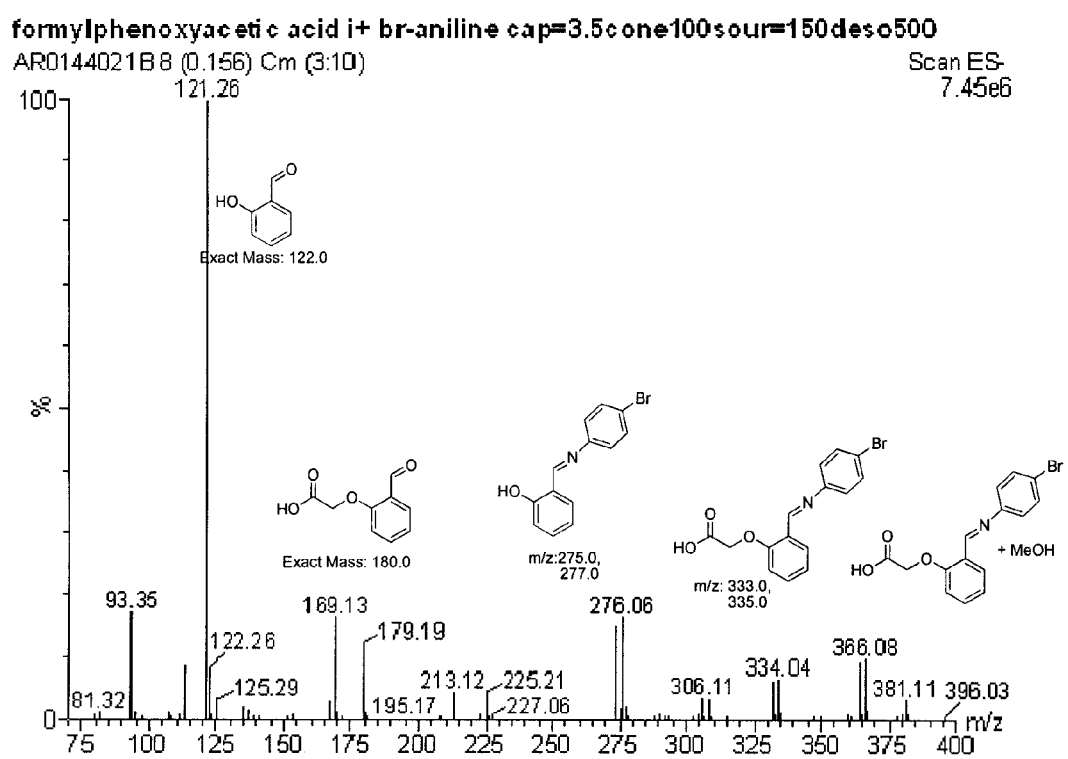
FIG. 16D shows ESI-MS (negative mode) of the formation of an imine from the reaction of 4-bromoaniline and 2-formyl phenoxyacetic acid in the electrospray. The product is increased as the cone voltage is increased to 100 volts (example 16).
Figure 16E:
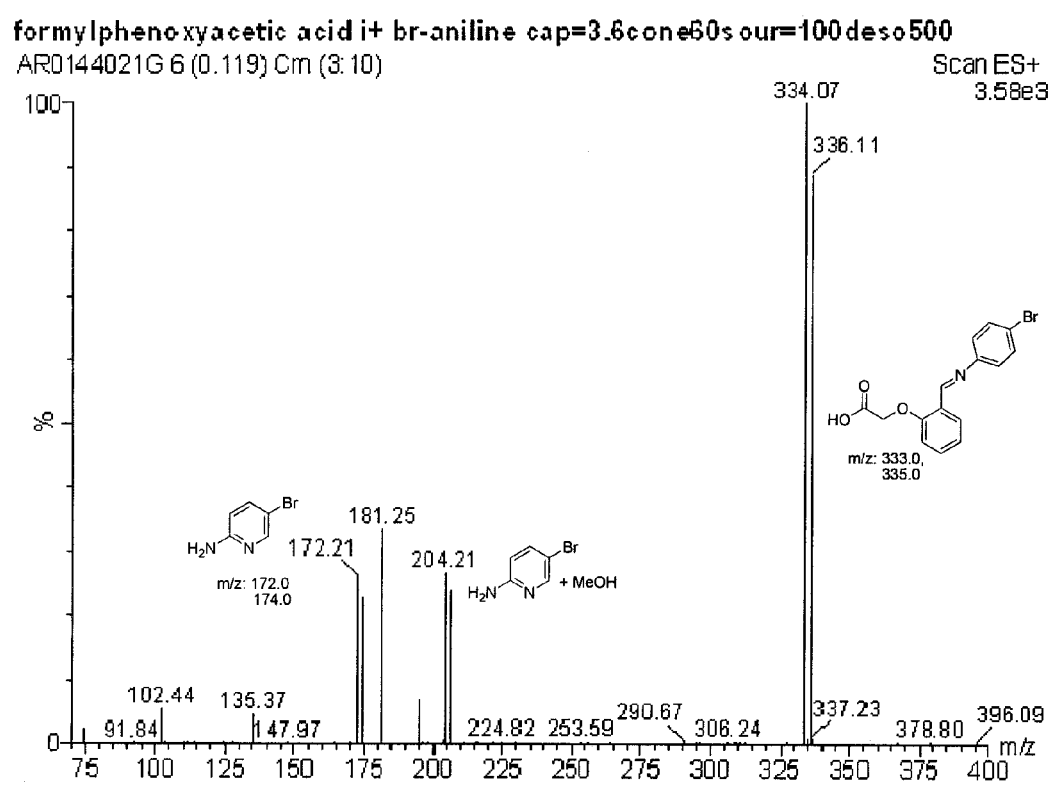
FIG. 16E shows ESI-MS (positive mode) of the formation of an imine from the reaction of 4-bromoaniline and 2-formyl phenoxyacetic acid in the electrospray (example 16).

A stock solution was prepared by dissolving 3-formyl phenoxyacetic acid (4 mg) in 4.3 ml of methanol. A portion of the above stock solution was placed in a 250 μL Hamilton gas tight syringe. The solution was infused at the rate of 10 μL/min into a Micromass Quattro Ultima ES-MS system using a Harvard syringe pump. Formation of product showed strong dependence on ES conditions such as cone voltage, source temperature and desolvation temperature. A signal corresponding to the 2-hydroxy-benzaldehyde was observed at 121 (n−1) (FIG. 15).

Example 16

Synthesis of Secondary Amine by Electrospray Ionization

A stock solution was prepared by dissolving 2-nitro-5-bromopyridine (8 mg) in 5 ml of methanol. A portion of the above stock solution was placed in a 250 μL Hamilton gas tight syringe. The solution was infused at the rate of 10 μL/min into a Micromass Quattro Ultima ES-MS system using a Harvard syringe pump. Formation of product showed strong dependence on ES conditions such as cone voltage, source temperature and desolvation temperature. A signal corresponding to the bis(5-bromopyridin-2-yl)amine was observed at 328, 330, and 332 (n+1) confirming two bromine atom in the molecule. The spectra for this example can be seen in FIG. 16.

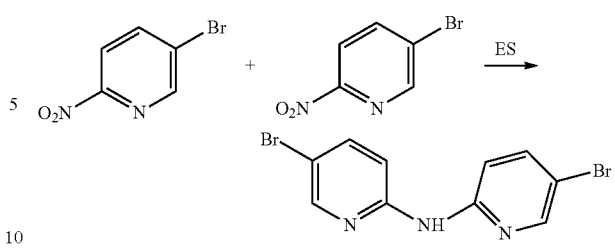

Example 17

Synthesis of Imine by Electrospray Ionization

A stock solution was prepared by dissolving 4-bromoaniline (14 mg) and 2-formyl phenoxyacetic acid in a solvent system comprising 3.7 ml of water and 5.4 ml of methanol. A portion of the above stock solution was placed in a 250 μL Hamilton gas tight syringe. The solution was infused at the rate of 10 μL/min into a Micromass Quattro Ultima ES-MS system using a Harvard syringe pump. Formation of the product showed strong dependence on ES conditions such as cone voltage, source temperature and desolvation temperature. A signal corresponding to the 2424 (4-bromophenylimino)methyl)phenoxy)acetic acid was observed at 328, 330, and 332 (n+1) confirming two bromine atom in the molecule.

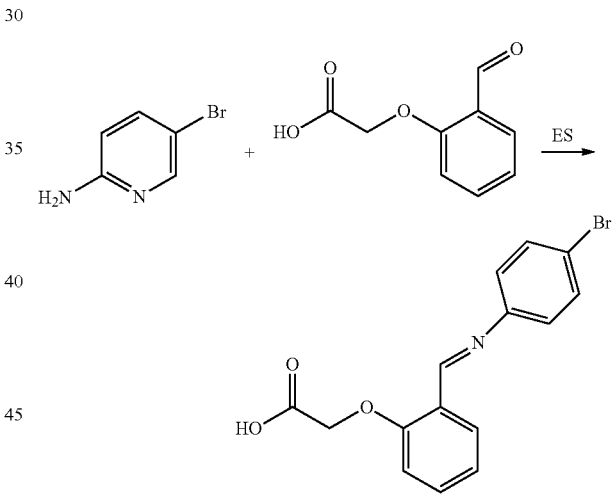

Example 18

Synthesis of Monoethyl and Diethyl Acetal by Electrospray Ionization

A stock solution was prepared by dissolving 2-formyl phenoxyacetic acid (5 mg) in 3.1 ml of ethanol. A portion of the above stock solution was placed in a 250 μL Hamilton gas tight syringe. The solution was infused at the rate of 10 μL/min into a Micromass Quattro Ultima ES-MS system using a Harvard syringe pump. Formation of product was strongly dependent on ES conditions such as cone voltage, source temperature and desolvation temperature. A signal corresponding to 2-(2-(diethoxymethyl)phenoxy)acetic acid was observed at 253 (n−1) in the negative mode. The product is favored at high desolvation temperature. High cone voltage, high source and desolvation temperature favors 2-(2-

Figure 17A:
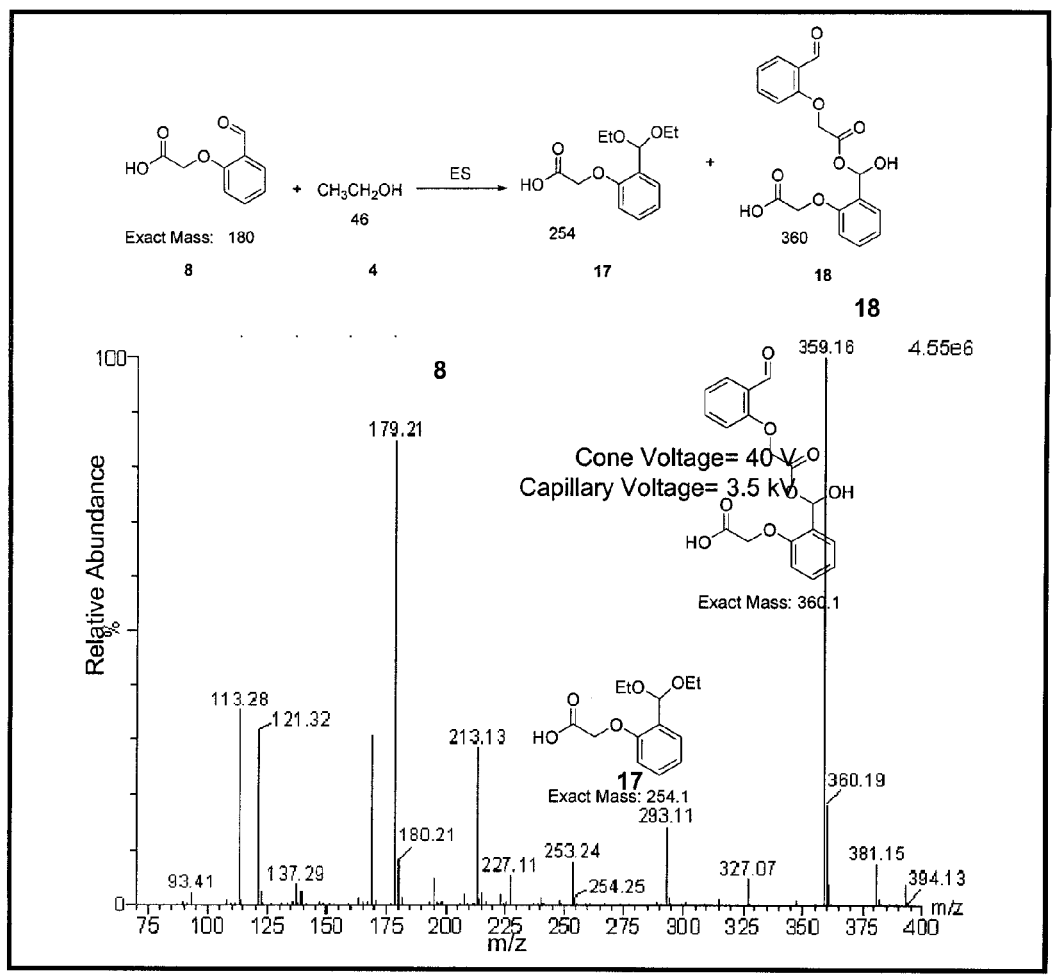
FIG. 17A shows ESI-MS (negative mode) of the formation of diethylacetal from the reaction of ethanol and 2-formyl phenoxyacetic acid in the electrospray (example 18).
Figure 17B:
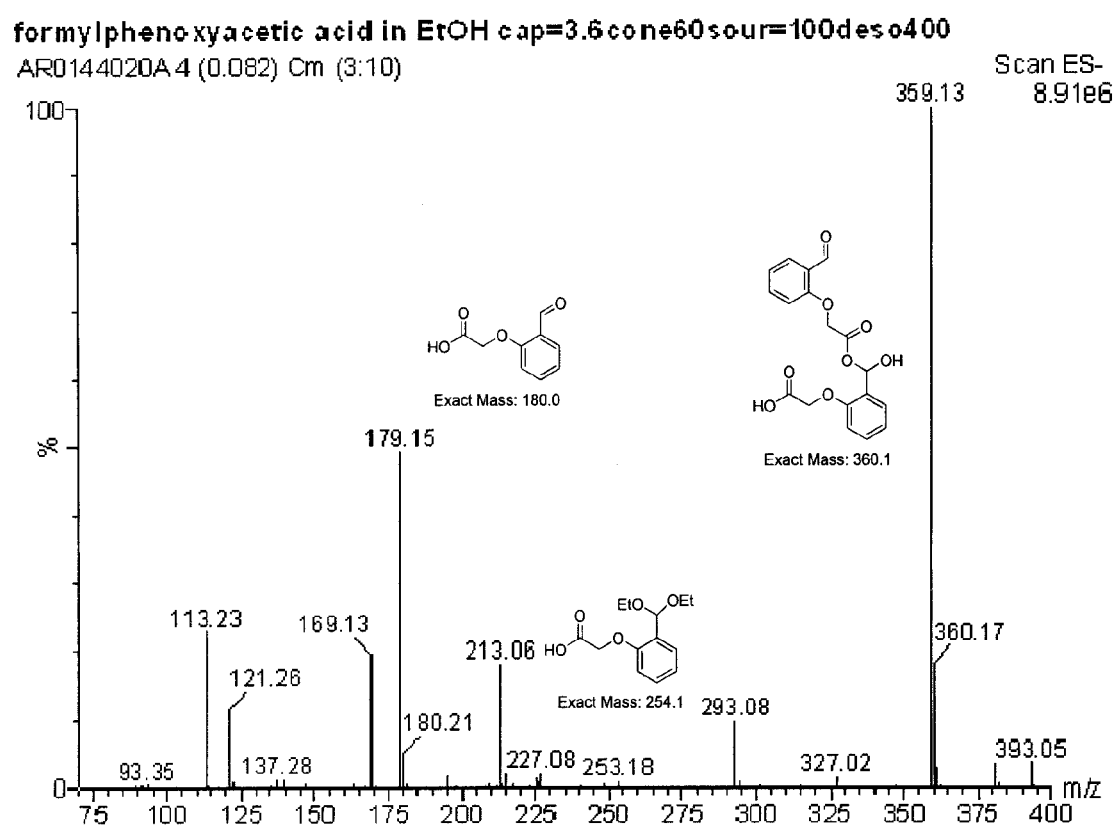
FIG. 17B shows ESI-MS (negative mode) of the formation of diethylacetal from the reaction of ethanol and 2-formyl phenoxyacetic acid in the electrospray. The formation of diethylacetal is decreased as the desolvation temperature is decreased from 500° C.
Figure 17C:
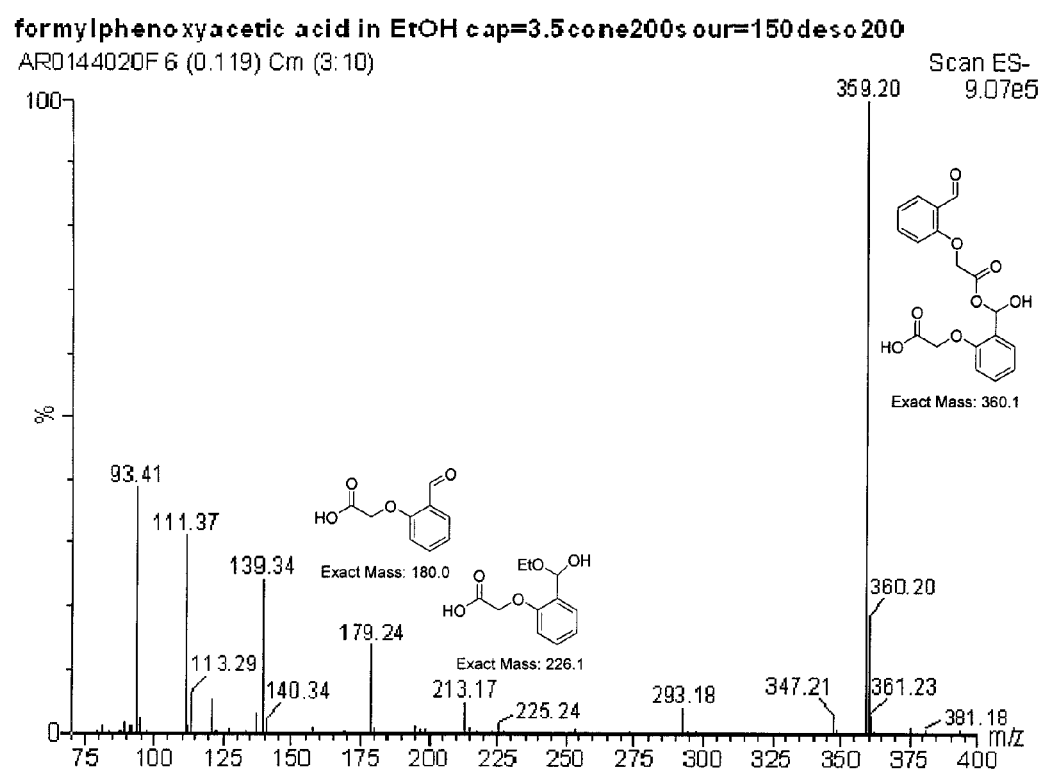
FIG. 17C shows ESI-MS (negative mode) of the formation of diethylacetal from the reaction of ethanol and 2-formyl phenoxyacetic acid in the electrospray. High cone voltage favors monoethylacetal over diethylacetal (example 18).

(ethoxy(hydroxy)methyl)phenoxy)acetic acid 225 (n-1). The spectra for this example can be seen in FIG. 17.

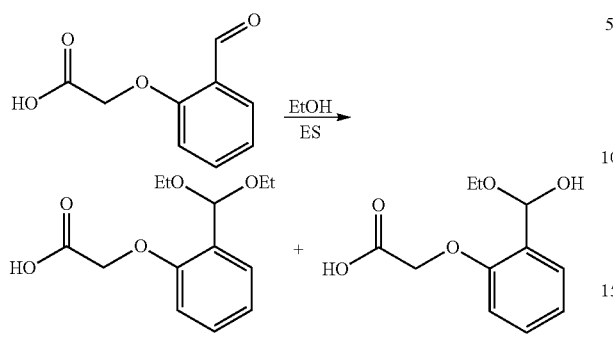

Example 19

Synthesis of Dimethyl Acetal by Electrospray Ionization

Figure 18A:
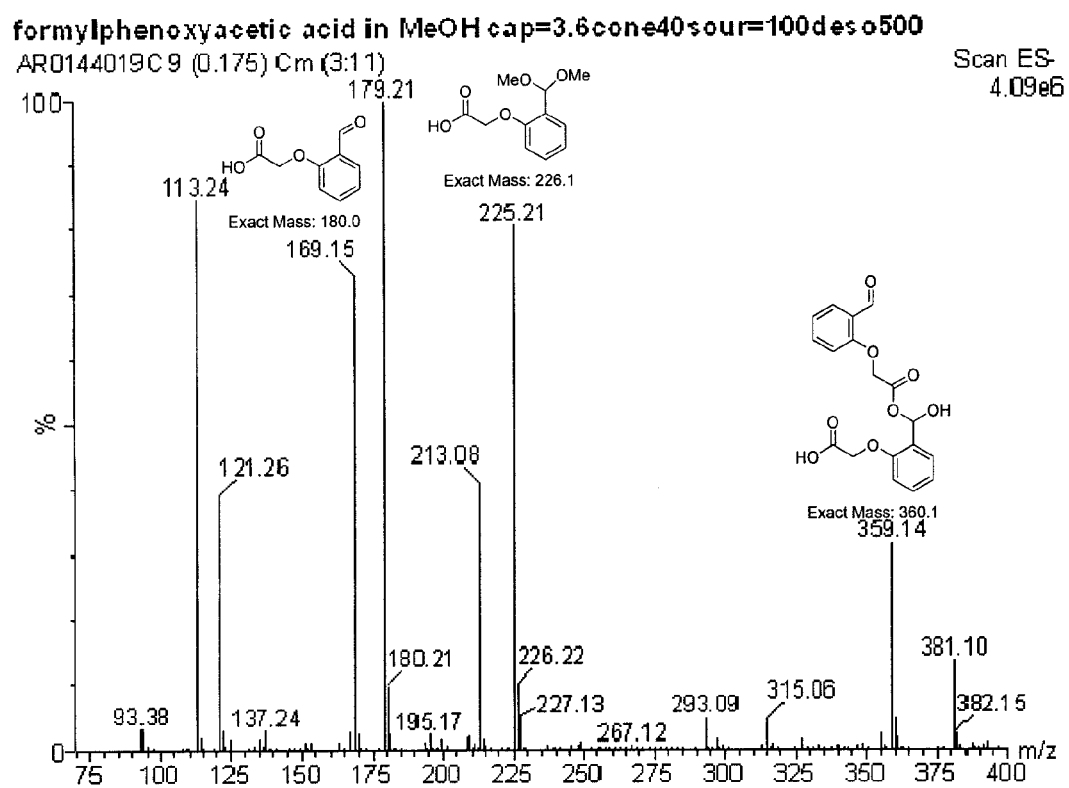
FIG. 18A shows ESI-MS (negative mode) of the formation of dimethylacetal from the reaction of methanol and 2-formyl phenoxyacetic acid in the electrospray (example 19).
Figure 18B:
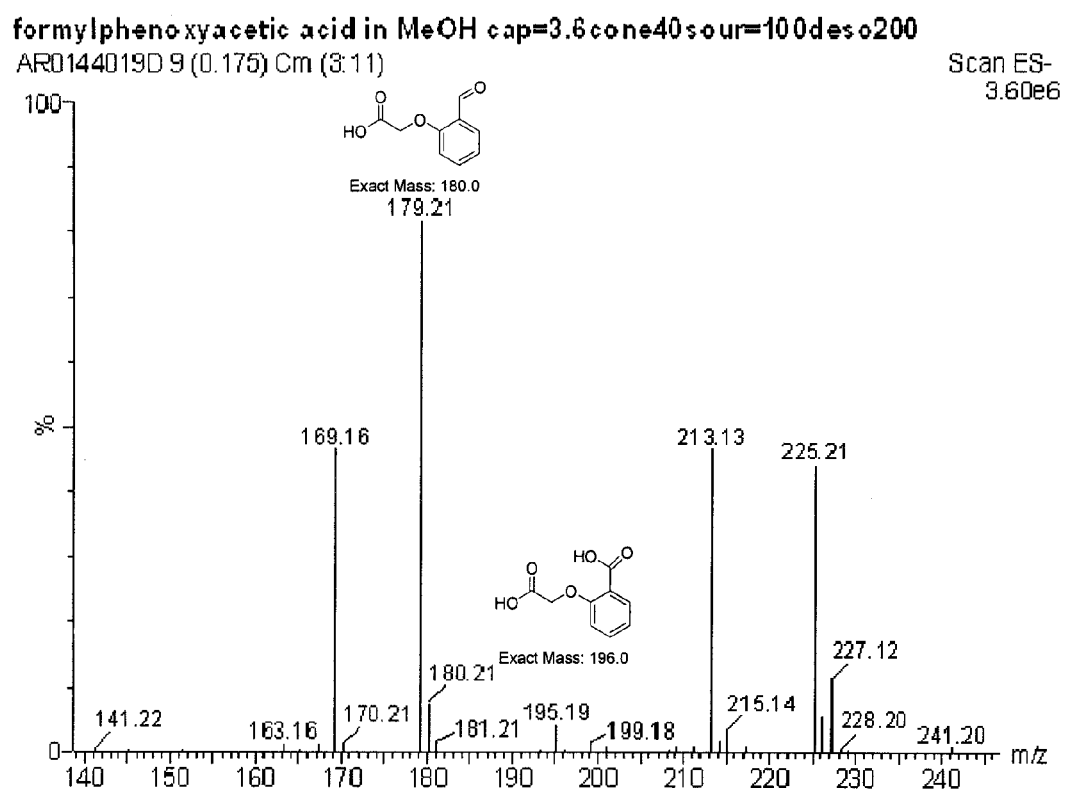
FIG. 18B shows ESI-MS (negative mode) of the oxidation of 2-formyl phenoxyacetic acid in the electrospray using a cone voltage of 40 volts and desolvation temperature of 200° C. (example 19).

A stock solution was prepared by dissolving 2-formyl phenoxyacetic acid (4 mg) in 2.5 ml of methanol. A portion of the above stock solution was placed in a 250 μL Hamilton gas tight syringe. The solution was infused at the rate of 10 μL/min into a Micromass Quattro Ultima ES-MS system using a Harvard syringe pump. Formation of product was strongly dependent on ES conditions such as cone voltage, source temperature and desolvation temperature. A signal corresponding to 2-(2-(dimethoxymethyl)phenoxy)acetic acid was observed at 225 (n-1) in the negative mode. The spectra for this example can be seen in FIG. 18.

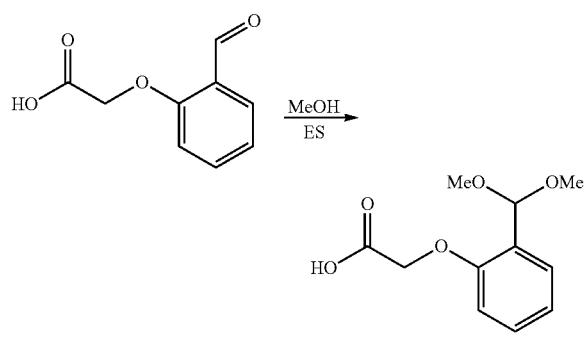

Example 20

Synthesis of Carboxylic Acid by Oxidation of Alcohol by Methods of Electrospray Ionization A stock solution was prepared by dissolving 2-formyl phenoxyacetic acid (4 mg) in 2.5 ml of methanol. A portion of the above stock solution was placed in a 250 μL Hamilton gas tight syringe. The solution was infused at the rate of 10 μL/min into a Micromass Quattro Ultima ES-MS system using Harvard syringe pump. Formation of the product was strongly dependent on ES conditions such as cone voltage, source temperature and desolvation temperature. A signal corresponding to 2-(carboxymethoxy)benzoic acid was observed at 196 (n-1) in the negative mode at low desolvation temperature. Increasing the desolvation temperature above 400 completely eliminated the signal due to oxidized product.

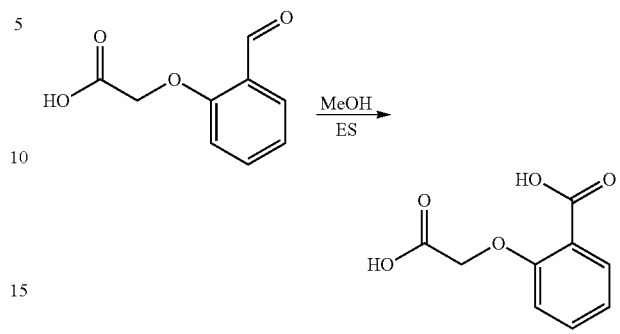

Example 21

Oxidation of Alcohol by Electrospray Ionization

A stock solution is prepared by dissolving 4-(hydroxymethyl)benzoic acid in water. A portion of the above stock solution is added to a 250 μL Hamilton gas tight syringe. The solution is infused into a Micromass Quattro Ultima ES-MS system using Harvard syringe pump at the rate of 10 μL/min. The product is observed in negative mode.

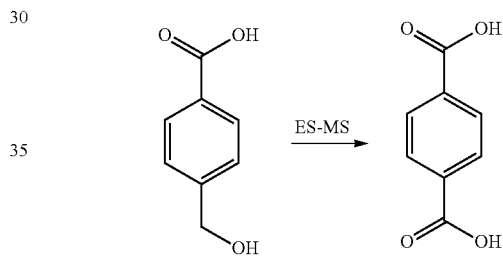

Example 22

Reduction of Azide by Electrospray Ionization

A stock solution is prepared by dissolving 4-(azidomethyl)pyridine in water. A portion of the above stock solution is added to a 250 μL Hamilton gas tight syringe. The solution is infused at the rate of 10 μL/min into a Micromass Quattro Ultima ES-MS system using Harvard syringe pump. The product is observed in positive mode.

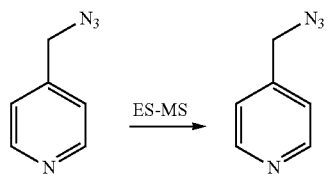 [SMILES: [N-]=[N+]=NCc1ccncc1 ; [N-]=[N+]=NCc1ccncc1]

Example 23

Cyclization Reactions: Formation of Aziridine by Electrospray Ionization

A stock solution is prepared by dissolving 2-aminoethanol in water. A portion of the above stock solution is added to a 250 μL Hamilton gas tight syringe. The solution is infused at the rate of 10 μL/min into a Micromass Quattro Ultima ES-MS system using a Harvard syringe pump at. The product is observed in positive mode.

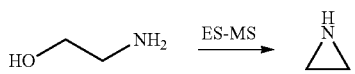

Example 24

Alkylation of Amine

A stock solution is prepared by dissolving 5-bromo-2-nitropyridine and cyclopentyl boronic acid in water. A portion of the above stock solution is added to a 250 μL Hamilton gas tight syringe. The solution is infused at the rate of 10 μL/min into a Micromass Quattro Ultima ES-MS system using a Harvard syringe pump. The product is observed in positive mode.

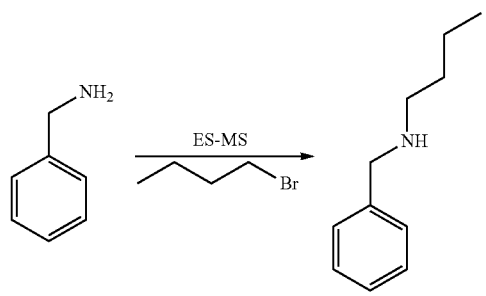

Example 25

Suzuki Reaction

A stock solution is prepared by dissolving 5-bromo-2-nitropyridine and cyclopentyl boronic acid and traces of palladium catalyst in water. A portion of the above stock solution is added to a 250 μL Hamilton gas tight syringe. The solution is infused at the rate of 10 μL/min into a Micromass Quattro Ultima ES-MS system using a Harvard syringe pump. The product is observed in positive mode.

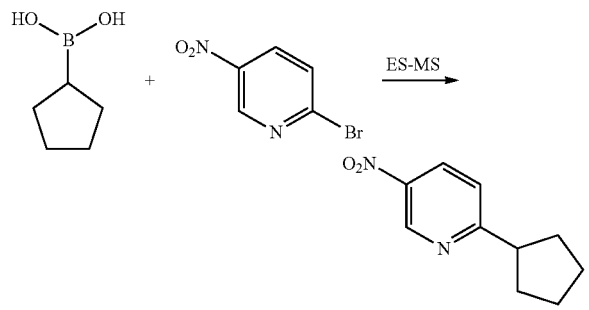

Example 26

Heck Reaction

A stock solution is prepared by dissolving 4-iodophenylalanine and methylacrylate and traces of palladium catalyst in methanol. A portion of the above stock solution is added to 250 μL Hamilton gas tight syringe. The solution is infused at the rate of 10 μL/min into a Micromass Quattro Ultima ES-MS system using a Harvard syringe pump. The product is observed in positive mode.

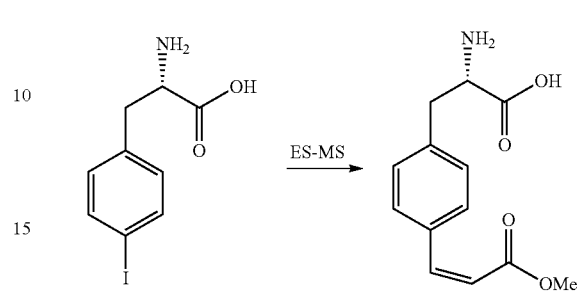

Example 27

Alkylation Reaction

A stock solution is prepared by dissolving 3-hydroxy pyridine in 1-bromobutane. A portion of the above stock solution is added to a 250 μL Hamilton gas tight syringe. The solution is infused at the rate of 10 μL/min into a Micromass Quattro Ultima ES-MS system using a Harvard syringe pump. The product is observed in positive mode.

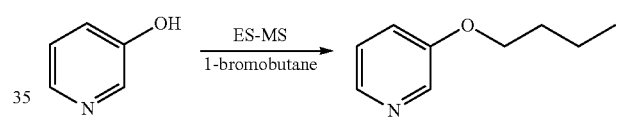

Example 28

Figure 19A:
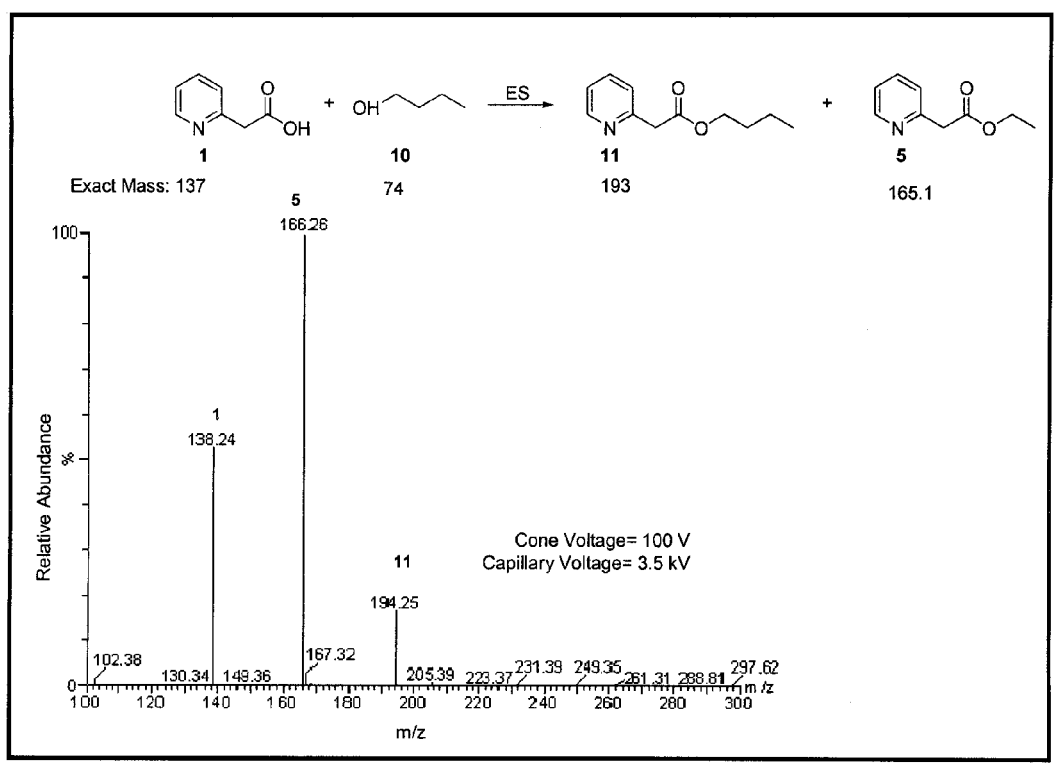
FIG. 19A shows ESI-MS spectrum (positive mode) of formation of butyl and ethyl ester from of 2-pyridylacetic acid in 1-butanol during electrospray at cone voltage of 100 V. The ethyl ester was formed by elimination reaction from the butyl ester. This is an example of 2-step synthesis in electrospray (example 28).
Figure 19B:
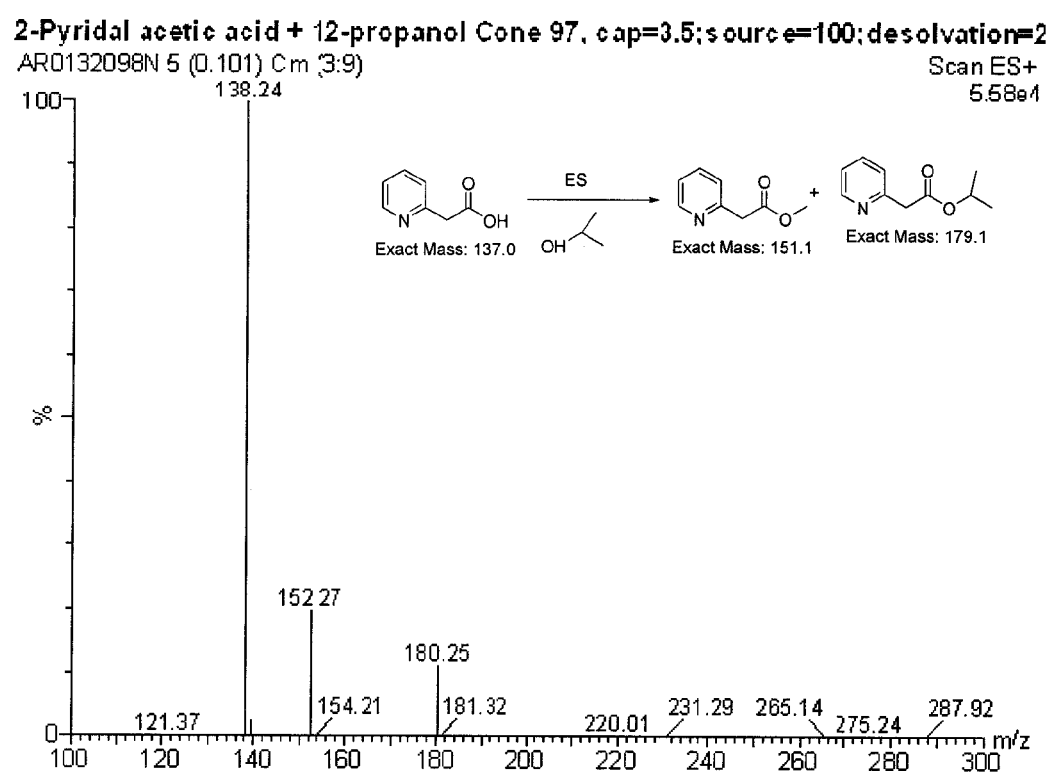
FIG. 19B shows ESI-MS spectrum (positive mode) of 2-pyridylacetic acid in 1-butanol during electrospray at cone voltage of 20V. No ester product was detected at low cone voltage (example 28).

Multi-Step Reaction 2-pyridylacetic acid hydrochloride was dissolved in 1-butanol and ES-MS spectrum were generated at constant capillary voltage of 3.5 kV and variety of cone voltage values, more specifically 100 and 20 V, as can be seen in FIGS. 19A and 19B respectively. The esterification process was favored at a high cone voltage. An ethyl ester resulting from elimination reaction from butyl ester was also observed. Thus, an ethyl ester was produced by a two-step reaction from 2-pridylacetic acid. No product was observed at cone voltage below 20V.

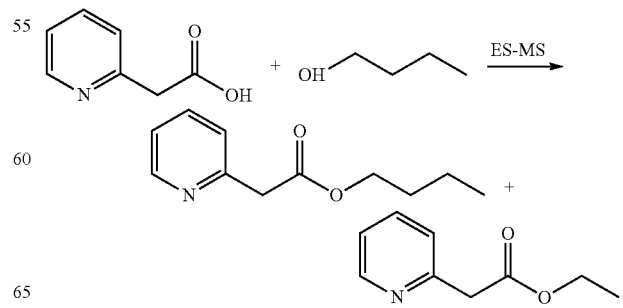

Example 29

Figure 20:
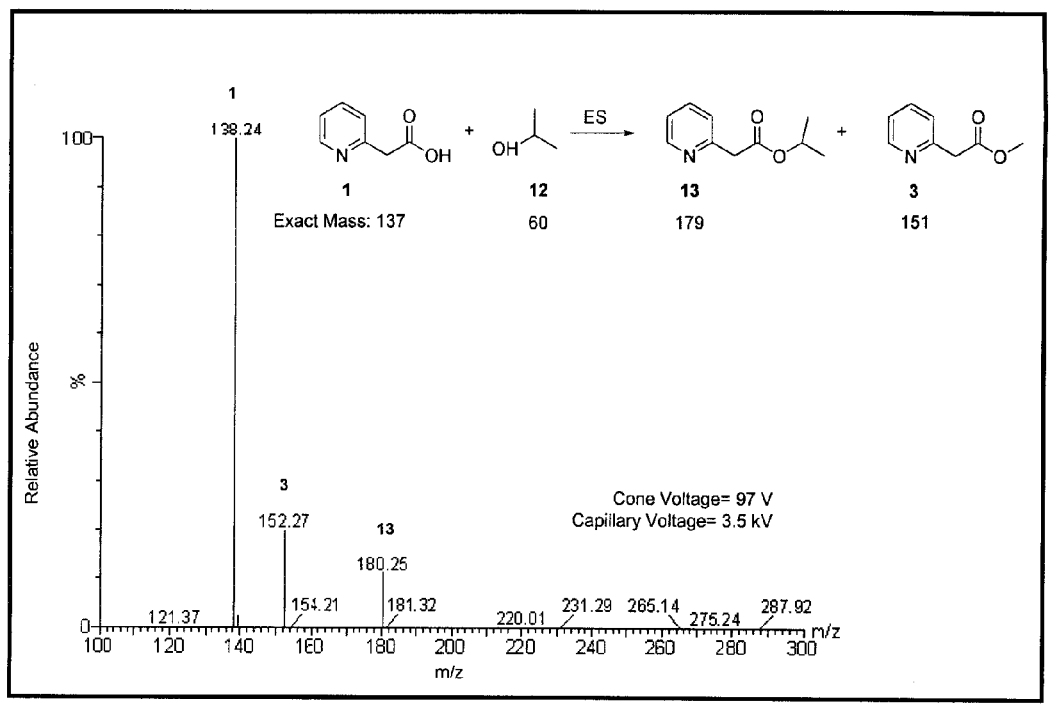
FIG. 20 shows ESI-MS spectrum (positive mode) of formation of propyl and methyl ester from of 2-pyridylacetic acid in 2-propanol during electrospray at cone voltage of 97 V. The methyl ester was formed by elimination reaction from the propyl ester. This is an example of 2-step synthesis in electrospray (example 29).

Elimination Reaction 2-pyridylacetic acid hydrochloride was dissolved in 2-propanol and ES-MS spectrum were generated at constant capillary voltage of 3.5 kV and cone voltage of 97V, as can be seen in the FIG. 20. The esterification process was favored at a high cone voltage. A methyl ester resulting from an elimination reaction was observed. A propyl ester was also observed.

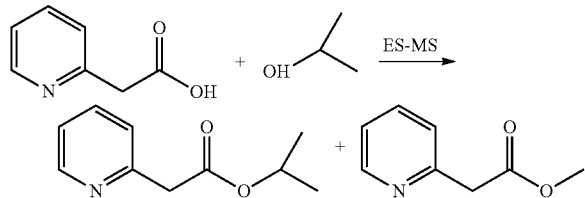

The invention claimed is:

1. A method of preparing and recovering a reaction product, comprising causing a chemical reaction by passing a reactant through an electrospray to provide a reaction mixture and recovering said reaction product from the reaction mixture, wherein said chemical reaction comprises a formation of carbon-carbon bonds, and wherein said reaction product is an organic molecule.

2. A method as claimed in claim 1, wherein said reaction product is in a quantity greater than 1 milligram.

3. The method of claim 1, wherein a capillary voltage of the electrospray is between 1.0 to 4.0 kV.

4. The method according to claim 1, wherein after recovering said reaction product from the reaction mixture, the reaction product is enriched by passing the reaction mixture through a second electrospray.

* * * * *